United States Patent
Okumura

(10) Patent No.: US 10,060,728 B2
(45) Date of Patent: Aug. 28, 2018

(54) THREE-DIMENSIONAL OBJECT-MEASUREMENT DEVICE, MEDIUM, AND CONTROL METHOD

(71) Applicant: NEC Corporation, Minato-ku, Tokyo (JP)

(72) Inventor: Fujio Okumura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 468 days.

(21) Appl. No.: 14/416,719

(22) PCT Filed: Apr. 5, 2013

(86) PCT No.: PCT/JP2013/002359
§ 371 (c)(1),
(2) Date: Jan. 23, 2015

(87) PCT Pub. No.: WO2014/016995
PCT Pub. Date: Jan. 30, 2014

(65) Prior Publication Data
US 2015/0176978 A1  Jun. 25, 2015

(30) Foreign Application Priority Data
Jul. 26, 2012  (JP) .................................. 2012-165940

(51) Int. Cl.
*G01C 9/00* (2006.01)
*G01B 11/14* (2006.01)
(Continued)

(52) U.S. Cl.
CPC ............ *G01B 11/14* (2013.01); *G01B 11/026* (2013.01); *G01B 11/24* (2013.01); *G01S 17/89* (2013.01);
(Continued)

(58) Field of Classification Search
CPC ...... G01S 17/48; G01S 7/4815; G01B 11/026; G01B 11/24; G01B 11/2518; G01B 11/14
(Continued)

(56) References Cited

U.S. PATENT DOCUMENTS

| | | | |
|---|---|---|---|
| 8,494,252 B2* | 7/2013 | Freedman | G06T 7/521 382/154 |
| 9,098,931 B2* | 8/2015 | Shpunt | G01B 11/2518 |
| 2010/0118123 A1 | 5/2010 | Freedman et al. | |

FOREIGN PATENT DOCUMENTS

| | | |
|---|---|---|
| JP | S62-098212 A | 5/1987 |
| JP | H08-129064 A | 5/1996 |

(Continued)

OTHER PUBLICATIONS

International Search Report for PCT Application No. PCT/JP2013/002359, dated Jun. 4, 2013.
(Continued)

*Primary Examiner* — An Do

(57) ABSTRACT

A three-dimensional object-measurement device comprising: a laser beam irradiation unit which irradiates a laser beam; a focal length changing unit which changes a focal length of the laser beam; an imaging unit which images a reflected light which is a reflection of the laser beam on an object, and generates image data; a control unit which changes the focal length by controlling the focal length changing unit, irradiates the same point on an object to be measured with the laser beam a plurality of times while varying the focal length, and makes the imaging unit generate the plurality of image data; and a distance calculation unit which calculates a distance to the object to be measured by processing the plurality of image data.

17 Claims, 24 Drawing Sheets

(51) Int. Cl.
  G01B 11/02 (2006.01)
  G01B 11/24 (2006.01)
  G01S 17/89 (2006.01)
  G02B 15/14 (2006.01)
  G06F 3/01 (2006.01)
  G06K 9/00 (2006.01)

(52) U.S. Cl.
  CPC .............. G02B 15/14 (2013.01); G06F 3/017 (2013.01); G06K 9/00201 (2013.01); G06K 9/00355 (2013.01)

(58) Field of Classification Search
  USPC .......................................... 702/127, 150–153
  See application file for complete search history.

(56) References Cited

FOREIGN PATENT DOCUMENTS

| | | |
|---|---|---|
| JP | H11-201718 A | 7/1999 |
| JP | 2001-141430 A | 5/2001 |
| JP | 2004-239791 A | 8/2004 |
| JP | 3635327 B | 4/2005 |
| JP | 2005-195738 A | 7/2005 |
| JP | 2007-010354 A | 1/2007 |
| JP | 2008-032707 A | 2/2008 |
| JP | 2008-233088 A | 10/2008 |
| JP | 2009-270937 A | 11/2009 |

OTHER PUBLICATIONS

Written Opinion of the International Search Authority for PCT Application No. PCT/JP2013/002359, dated Jun. 4, 2013.

* cited by examiner

THREE-DIMENSIONAL OBJECT-MEASUREMENT DEVICE, MEDIUM, AND CONTROL METHOD

This application is a National Stage Entry of PCT/JP2013/002359 filed on Apr. 5, 2013, which claims priority from Japanese Patent Application 2012-165940 filed on Jul. 26, 2012, the contents of all of which are incorporated herein by reference, in their entirety.

TECHNICAL FIELD

The present invention relates to a three-dimensional object-measurement device, a medium embodying a three-dimensional object-measurement device control program, and a control method of a three-dimensional object-measurement device.

BACKGROUND ART

In recent years, developments of human interface devices have been accelerated that use gestures, as an input means, which are movements of human bodies including hands and arms. Such interface devices receive a user's gesture as an input and recognize the gesture to respond thereto with video, sound or operation of an apparatus.

An interface device using a gesture as an input means has a three-dimensional object-measurement device which measures a distance between each point (such as each part of a user's body) on a three-dimensional object by which an input is applied and the device itself. The above interface device repeats measurement of a distance between each part of a user's body and the device itself by using the three-dimensional object-measurement device and recognizes user's movements based on a change of the distance. Various three-dimensional object-measurement devices have been recently developed.

The device recited in Patent Literature 1 calculates a distance to a target to be measured by using triangulation. The above device includes a pattern generator which generates a light with a random pattern and a camera which images a reflected light which is a light irradiated from the pattern generator and reflected on a target to be measured. Then, based on a position of each pattern in an obtained image, a distance to a target to be measured is calculated based on triangulation.

The device recited in Patent Literature 2 calculates a distance to a target to be measured in the following manner. First, the above device splits a laser beam into a plurality of laser beams. Next, with respect to each of the split laser beams, the above device changes a focal length of each laser beam such that each laser beam converges only on one axis differing on a plane perpendicular to a progressing direction of the laser beam and each laser beam has a different focal length. Then, the above device images a reflected light obtained as a result of reflection of all the split laser beams on an object to be measured, and calculate a distance to the object to be measured based on a cross-sectional shape of the reflected light.

The position measuring method recited in Patent Literature 3 is a method for calculating a distance to an object to be measured by imaging a measurement target by zooming at different magnifications a plurality of times and comparing the positions of the same point on the object to be measured in the images as a result of imaging.

The device recited in Patent Literature 4 is a three-dimensional measurement device which obtains a shape of a surface of a subject three-dimensionally. The above device has an imaging means to image a subject a plurality of times. Specifically, the above device images a subject while adjusting a focus and zooming of the imaging means for each of xy coordinates on an xy plane forming an image frame. Then, the above device calculates a z coordinate of a surface of the subject in each of the xy coordinates based on an imaging result.

The device recited in Patent Literature 5 calculates a distance to each part of an object to be measured using a plurality of confocal optical systems having different focal positions. The above confocal optical system is configured with a laser beam source and a photoelectric sensor. While changing a position of each confocal optical system, the above device irradiates an object to be measured with a laser beam from the laser beam source of each confocal optical system, and scans an object to be measured. Then, the above device measures intensity of a reflected light of a laser beam by a photoelectric sensor of each confocal optical system and, based on the intensity, measures a distance to an object to be measured.

The device recited in Patent Literature 6 irradiates a measurement target with a laser beam and calculates a distance to the object to be measured based on a time from application of the laser beam to the measurement target until a reflected light is sensed by an optical receiver.

CITATION LIST

Patent Literature

PLT 1: US Patent Application Publication No. US 2010/0118123 A1
PLT 2: Japanese Unexamined Patent Publication No. 2008-32707
PLT 3: Japanese Unexamined Patent Publication No. 2004-239791
PLT 4: Japanese Patent No. 3635327
PLT 5: Japanese Unexamined Patent Publication No. 2009-270937
PLT 6: Japanese Unexamined Patent Publication No. H08(1996)-129064

SUMMARY OF INVENTION

Technical Problem

First, for making an interface device having a three-dimensional object-measurement device mountable on a small-sized apparatus such as a portable terminal, the above three-dimensional object-measurement device is preferably made in small size. Secondly, when using the above interface device as an interface device in a portable terminal or other, the above three-dimensional object-measurement device is preferably capable of measuring a distance to a measurement target located at a short distance from the device itself. When a user operates a portable terminal with his/her finger, for example, the user's finger is located at an extremely short distance from the portable terminal. For the above interface device to recognize such a movement of the user' finger, the above three-dimensional object-measurement device is preferably capable of measuring a distance to the user's finger at a short distance. Thirdly, cost reduction is required of three-dimensional object-measurement devices.

It is, however, difficult for conventional art to solve the above three problems simultaneously.

An object of the present invention is to provide a low-cost three-dimensional object-measurement device which is small in size and capable of measuring a distance to an object located at a short distance, a computer readable medium embodying a three-dimensional object-measurement device control program, and a control method for controlling the three-dimensional object-measurement device.

Solution to Problem

The present invention provides a three-dimensional object-measurement device includes: a laser beam irradiation unit which irradiates a laser beam; a focal length changing unit which changes a focal length of the laser beam; an imaging unit which images a reflected light which is a reflection of the laser beam on an object, and generates image data; a control unit which changes the focal length by controlling the focal length changing unit, irradiates the same point on an object to be measured with the laser beam a plurality of times while varying the focal length, and makes the imaging unit generate the plurality of image data; and a distance calculation unit which calculates a distance to the object to be measured by processing the plurality of image data.

The present invention provides a computer readable non-transitory medium embodying a program, the program causing a three-dimensional object-measurement device to performs a method, the method includes: irradiating a laser beam; changing a focal length of the laser beam; imaging a reflected light which is a reflection of the laser beam on an object and generating image data; changing a focal length irradiating the same point on an object to be measured with the laser beam a plurality to times while varying a focal length; generating the image data; and calculating a distance to the object to be measured by processing the plurality of image data.

The present invention provides a control method for controlling a three-dimensional object-measurement device which measures a distance to an object to be measured, includes; irradiating a laser beam; changing a focal length of the laser beam; imaging means for imaging a reflected light which is a reflection of the laser beam on an object and generating image data; changing a focal length; irradiating the same point on an object to be measured with the laser beam a plurality of times while varying the focal length; generating the plurality of image data; and calculating a distance to the object to be measured by processing the plurality of image data.

Advantageous Effects of Invention

The present invention enables provision of a small-sized three-dimensional object-measurement device which can be realized at low cost and is capable of measuring a distance to an object located at a short distance, a computer readable medium embodying a three-dimensional object-measurement device control program, and a three-dimensional object-measurement device control method for controlling the three-dimensional object-measurement device.

BRIEF DESCRIPTION OF THE DRAWINGS

The foregoing and other objects, features and advantages will become more apparent from preferred exemplary embodiments which will be described below and the accompanying drawings set forth below.

DESCRIPTION OF EMBODIMENTS

Figure 1:
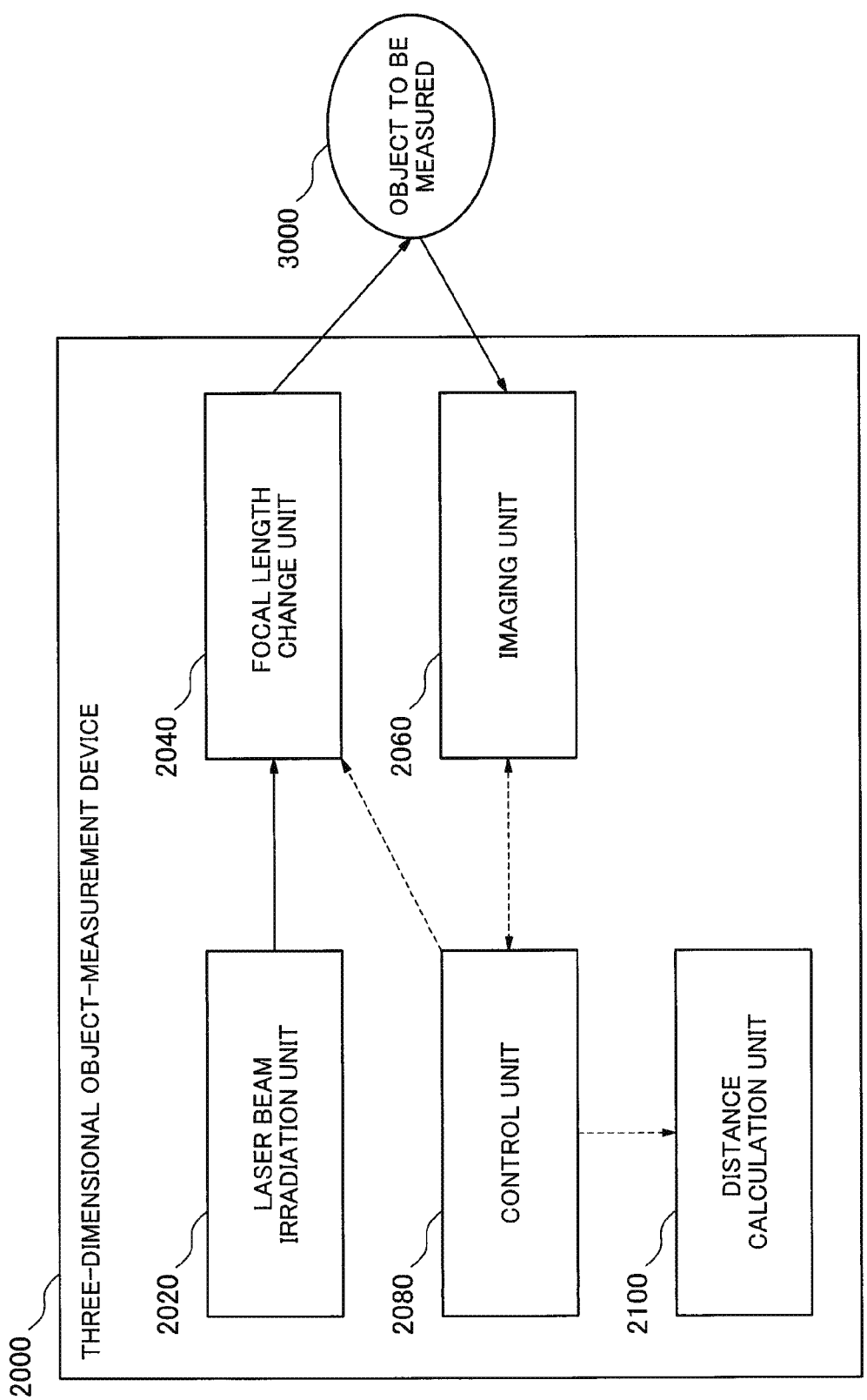
FIG. 1 is a block diagram showing a three-dimensional object-measurement device according to an exemplary embodiment 1 together with an object to be measured.

An exemplary embodiment of the present invention will be described below with reference to the drawings. In all the drawings, like components are identified by the same reference numerals to appropriately omit description thereof.

In the following description, each component of each device represents not a configuration on a hardware unit but a block on a function unit. Each component of each device is realized by an arbitrary combination of hardware and software, centered on a CPU, a memory, a program realizing components shown in the drawings and loaded into the memory, a storage medium such as a hard disk which stores the program, and a network connecting interface. Then, a method and a device for realization thereof include various modifications.

Exemplary Embodiment 1

<Outline>

FIG. 1 is a block diagram showing a three-dimensional object-measurement device 2000 according to an exemplary embodiment 1 together with an object 3000 to be measured. A solid line arrow in FIG. 1 represents a flow of a laser beam which will be described later, and a dotted line arrow represents a flow of information.

The three-dimensional object-measurement device 2000 irradiates the same measuring point on the object 3000 to be measured with each of a plurality of laser beams whose focal lengths are changed to be different with each other, and images its reflected light. Then, the three-dimensional object-measurement device 2000 calculates a distance to the above measuring point by processing a plurality of image data as a result of imaging. The reflected light of the laser beam to be recorded as image data here shows a cross-section of the laser beam on the measuring point of the object 3000 to be measured. In the following, a cross-section of a laser beam is referred to as a spot.

The three-dimensional object-measurement device 2000 includes a laser beam irradiation unit 2020, a focal length change unit 2040, and an imaging unit 2060. The laser beam irradiation unit 2020 irradiates a laser beam. The focal length change unit 2040 changes a focal length of the laser beam irradiated by the laser beam irradiation unit 2020. The imaging unit 2060 images a spot generated by the above laser beam at a measuring point on the object 3000, and generates image data.

In addition, the three-dimensional object-measurement device 2000 includes a control unit 2080. The control unit 2080 controls the focal length change unit 2040 and the imaging unit 2060. Specifically, the control unit 2080 irradiates the same measuring point on the object 3000 to be measured with each of a plurality of laser beams whose focal lengths are changed to be different by controlling the focal length change unit 2040. Then, the control unit 2080 makes images a spot, generated by each of the plurality of laser beams having difference focal lengths, at the same measuring point on the object 3000 to be measured be imaged by controlling the imaging unit 2060, and obtains image data of each imaged spot.

Further, the three-dimensional object-measurement device 2000 includes a distance calculation unit 2100. The distance calculation unit 2100 processes the above plurality of image data, and calculates a distance to the measuring point on the object 3000 to be measured.

As described in the foregoing, the three-dimensional object-measurement device 2000 of the present exemplary embodiment irradiates the same measuring point on the object 3000 to be measured with each of a plurality of laser beams whose focal lengths are changed to be different by the focal length change unit 2040. Then, the three-dimensional object-measurement device 2000 images each spot generated at the same measuring point by each laser beam by the imaging unit 2060. Then, the three-dimensional object-measurement device 2000 processes image data as a result of imaging and calculates a distance to the measuring point on the object 3000 to be measured by the distance calculation unit 2100. Based on this configuration, the three-dimensional object-measurement device 2000 can realize a small size and measurement by the object 3000 located at a short distance with low cost. First, unlike a device conducting triangulation, the three-dimensional object-measurement device 2000 does not need a distance between the laser beam irradiation unit 2020 and the imaging unit 2060. This enables the three-dimensional object-measurement device 2000 to be a small-sized device. In addition, because a spot can be imaged at a short distance, the three-dimensional object-measurement device 2000 can measures a distance to the object 3000 to be measured located at a short distance from the three-dimensional object-measurement device 2000. Further, because a cross-sectional shape of a spot may be a simple shape such as a round shape, the distance calculation unit 2100 can calculate a distance to the object 3000 to be measured even from image data generated by a low resolution camera. Accordingly, the three-dimensional object-measurement device 2000 can be produced at low cost.

In the following, details of the present exemplary embodiment will be described.

<Principle of Distance Calculation Using Spot at Measuring Point>

As described above, the three-dimensional object-measurement device 2000 calculates a distance to the measuring point by irradiating the same measuring point on the object 3000 to be measured with each of a plurality of laser beams having different focal lengths, imaging a spot on the measuring point, and processing image data as a result of the imaging. Principle of the calculation method will be described in the following.

Figure 2:
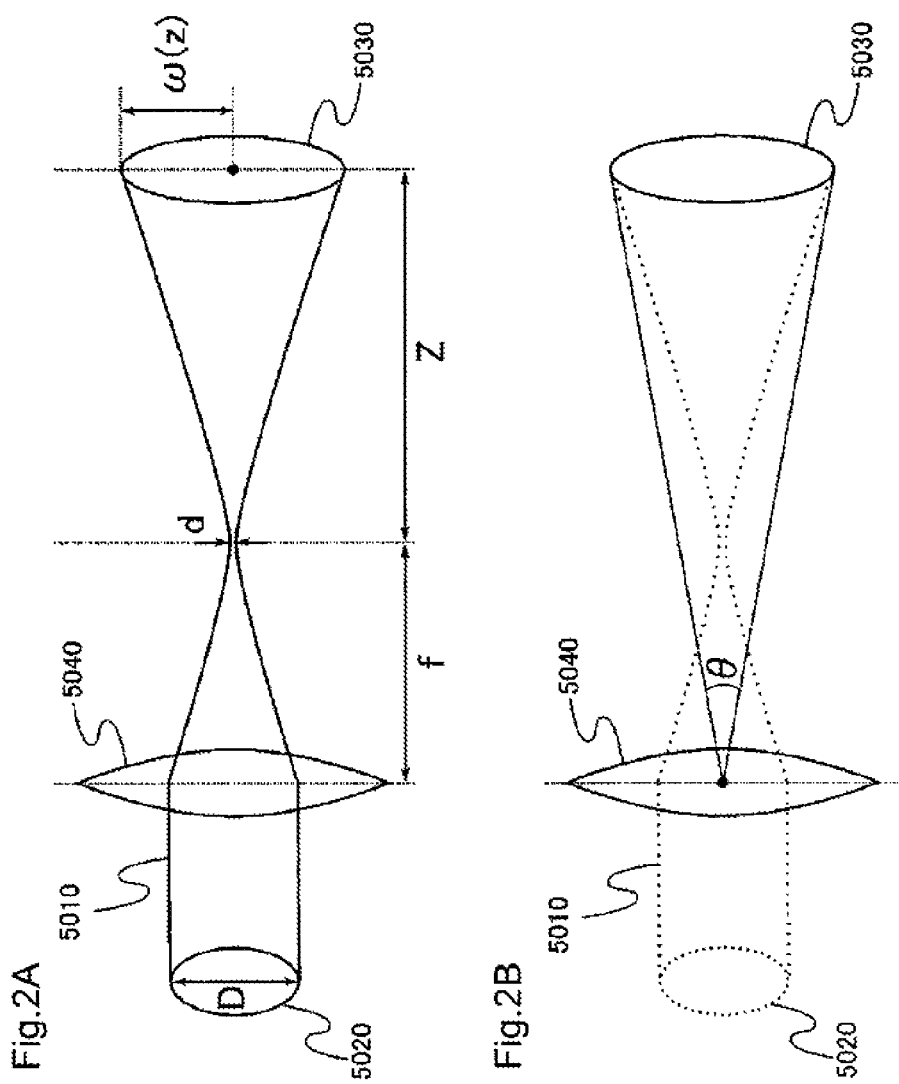
FIG. 2A is a diagram showing a relation between a laser beam and a spot generated on a measuring point by the laser beam.
FIG. 2B is a diagram showing a relation between a laser beam and a spot generated on a measuring point by the laser beam.

First, optical properties of a laser beam will be described with reference to FIG. 2A and FIG. 2B. FIG. 2A shows a change in a spot diameter of a laser beam with a position. A laser beam 5010 is a collimated laser beam. A spot 5020 represents a cross-section of the laser beam 5010 before passing through a lens 5040. D denotes a diameter of the spot 5020. The lens 5040 is a lens which changes a focal length of the laser beam 5010. f denotes a focal length of the laser beam 5010 after passing through the lens 5040. d denotes a spot diameter of the laser beam 5010 at a focal position. A spot 5030 represents a spot located at a distance Z away from the focal point. $\Omega(z)$ denotes a radius of the spot 5030.

The laser beam 5010 with the diameter D incident on the lens 5040 have a minimum diameter d at the focal position.

This portion is referred to as a beam waist. When assuming an ideal Gaussian beam, d is given by the following Numerical Formula 1. Here, λ denotes a wavelength of a laser beam.

[Numerical Formula 1]

$$d = \frac{4\lambda f}{\pi D} \quad (1)$$

If a beam waist radius is represented by ω0 (ω0=d/2), ω(z) will be given by the following formula. It can be found from FIG. 2A and Numerical Formula 2 that the laser beam 5010 beyond the beam waist spreads.

[Numerical Formula 2]

$$\omega(z) = \omega_0 \left[1 + \left[\frac{\lambda z}{\pi \omega_0^2}\right]^2\right]^{1/2} \quad (2)$$

As a value indicative of the degree of spread of the laser beam 5010 beyond the beam waist, an angle θ viewing the spot 5030 from the center position of the lens 5040 is defined (see FIG. 2B).

Figure 3:
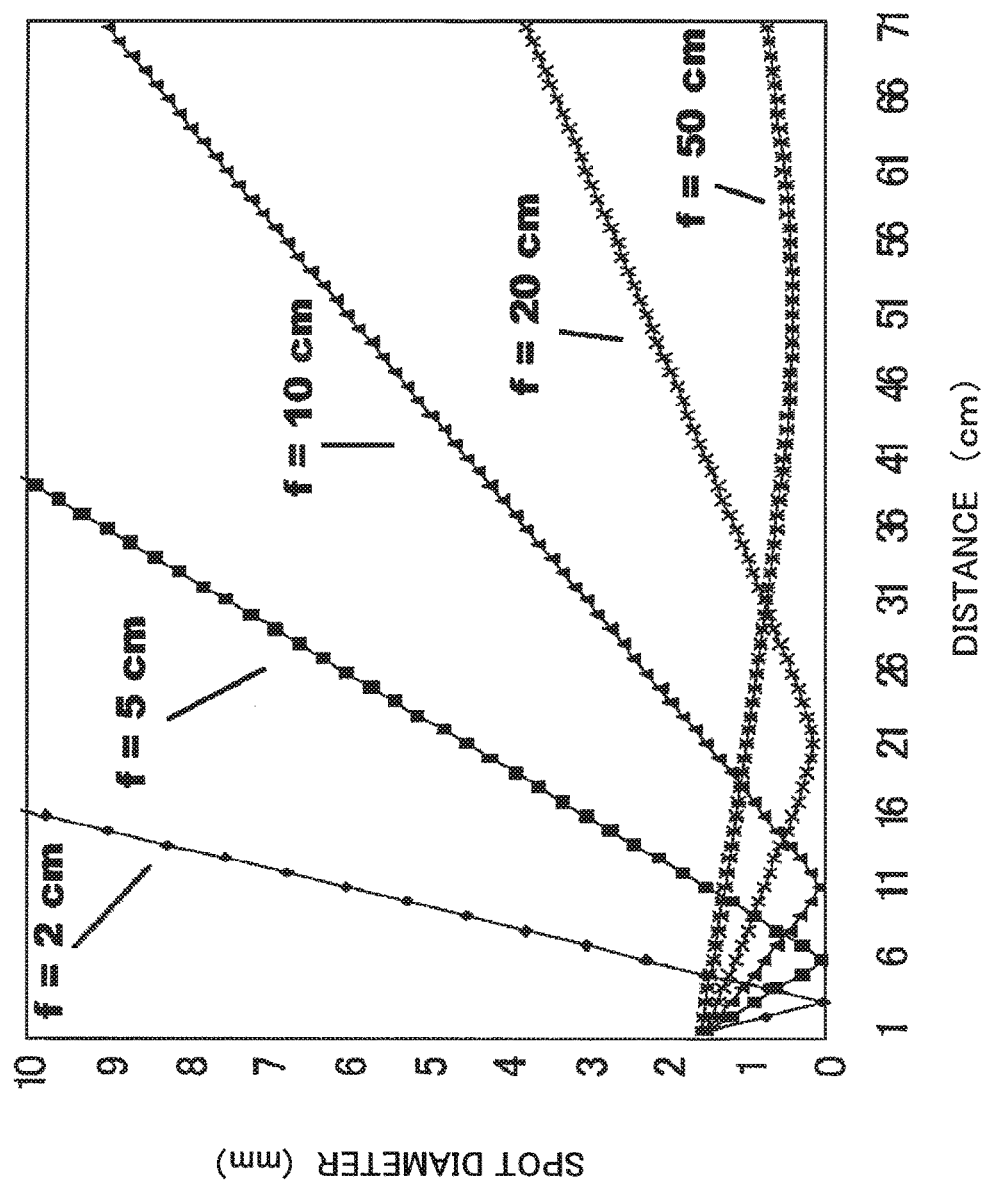
FIG. 3 is a diagram showing a relation between a distance to a measuring point and a spot diameter.

FIG. 3 shows a distance-dependency of a spot diameter of the spot 5030 in a case where the diameter D of the spot 5020 is 1.5 mm. As has been described with respect to FIG. 2A, the spot diameter of the spot 5030 is decreased until the beam waist and is increased after the beam waist.

Figure 4:
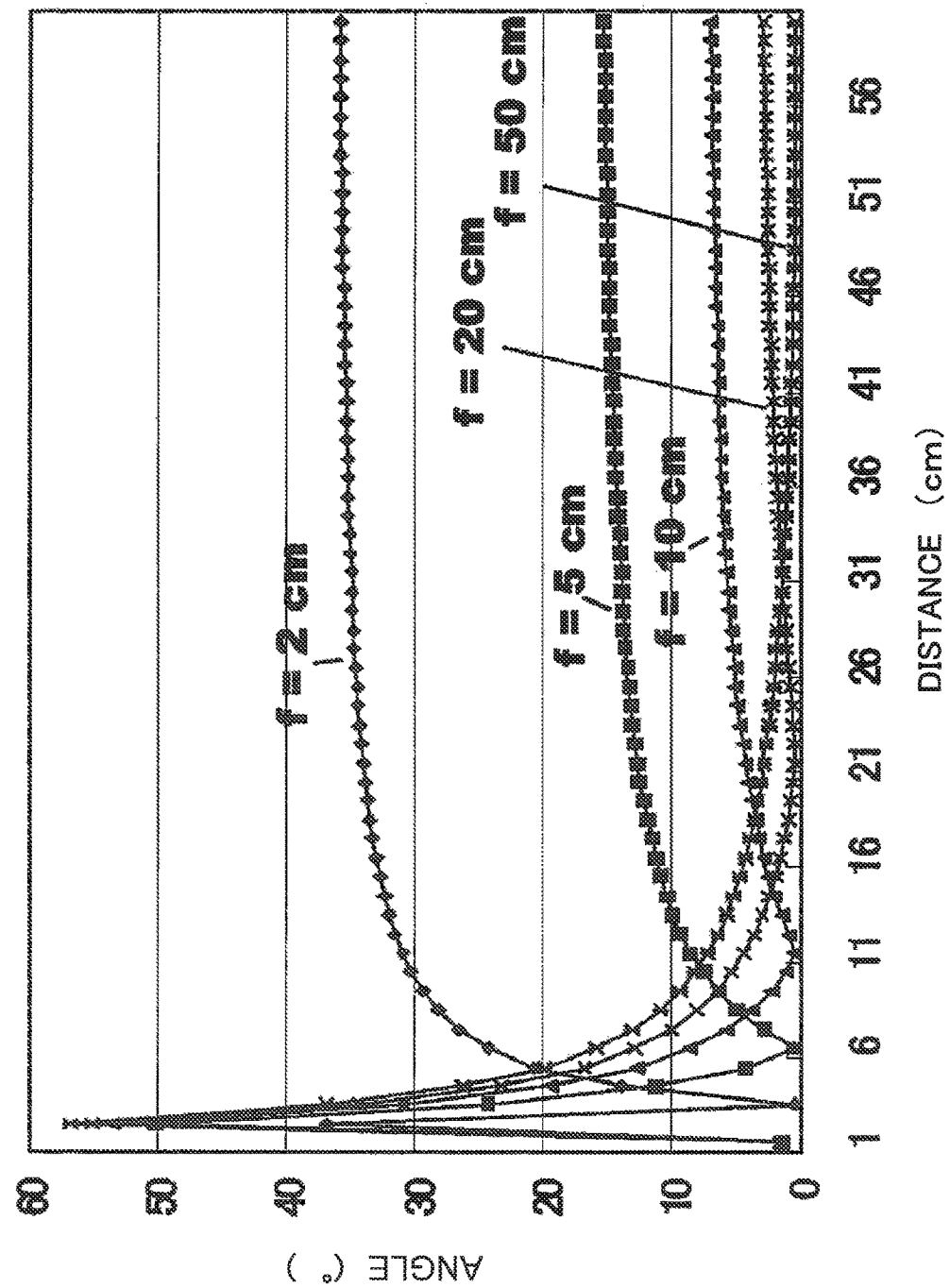
FIG. 4 is a diagram showing a relation between a distance to a measuring point and an angle viewing a spot.

FIG. 4 shows a distance-dependency of an angle θ viewing the spot 5030. θ becomes large in the vicinity of the lens 5040 and becomes the minimum at the beam waist. Then, while the value of θ is increased beyond the beam waist, the degree of its increase is gradually reduced. In case of a spot which is monotonously increased from a place where its image is picked up, for example, the angle θ viewing the spot will be constant regardless of a distance. Accordingly, in this case, a position of the spot cannot be calculated based on the angle θ. Therefore, the focal length of the laser beam 5010 is changed such that the size of the spot 5030 will be increased after being reduced until reaching the focal point, as shown in FIG. 2A. This makes the angle θ to change with a distance, as shown in FIG. 4.

The angle θ viewing the spot 5030 can be calculated by processing two-dimensional image data. The angle θ can be calculated, for example, from a field angle of an imaging means and a spot diameter in image data.

Figure 24:
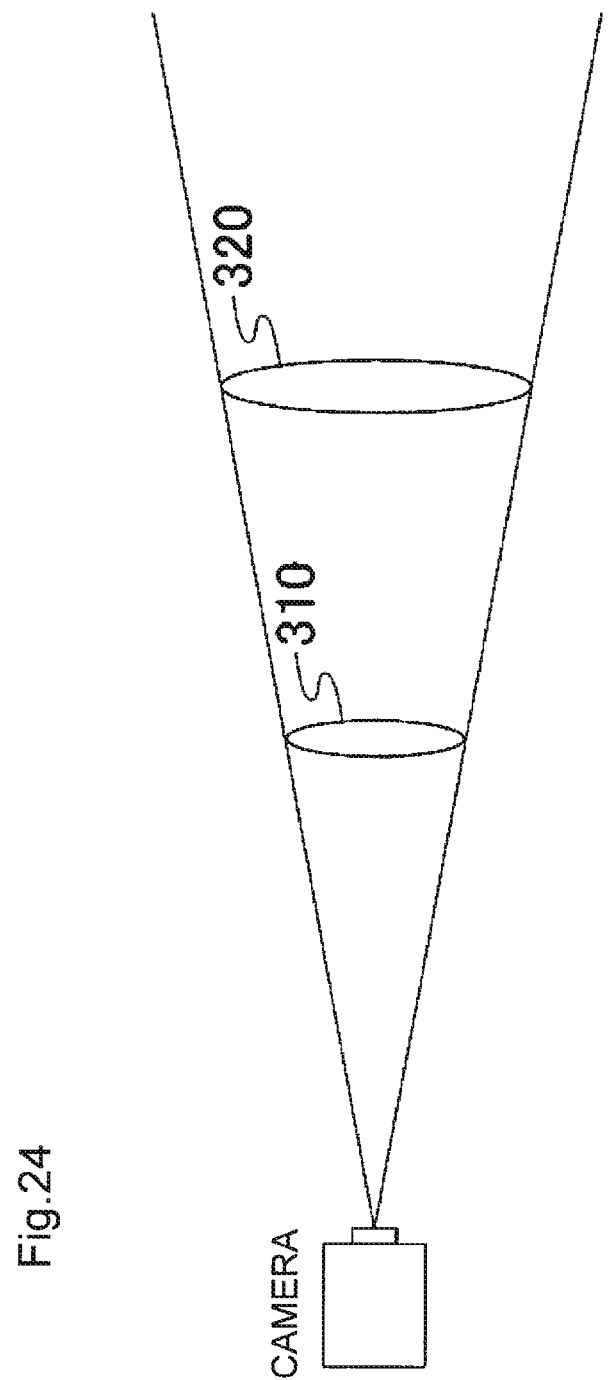
FIG. 24 is a diagram showing how a camera images spots having different sizes as objects of the same size.

By contrast, an actual spot diameter on a measuring point cannot be calculated directly from two-dimensional image data. For example, when comparing image data imaged at a spot 310 and image data imaging a spot 320 by a camera shown in FIG. 24, both spots will have the same size in the image data. Thus, an actual spot diameter cannot be determined based on just its size in image data.

Therefore, the three-dimensional object-measurement device 2000 calculates an angle θ viewing the spot 5030 at a measuring point on the object 3000 to be measured from the three-dimensional object-measurement device 2000, and calculates a distance to the measuring point by using the calculated angel θ. Specifically, the three-dimensional object-measurement device 2000, for example, can calculates a distance to the measuring point on the object 3000 to be measured from the angle θ with reference to such a relation between an angle θ and a distance to the spot 5030 as shown in FIG. 4.

There are some cases in that a distance to the spot 5030 cannot be calculated by calculating just one angle θ. This is because there is some case in which the angle θ viewing the spot 5030 ahead of the beam waist and the angle θ viewing the spot 5030 behind the beam waist are same. For example, in FIG. 4, in a case of the focal length f of 5 cm, θ is 10° at distances of 3.1 cm and 12 cm. Thus, only with an image data obtained by imaging a spot generated with the focal length of the laser beam 5010 changed one way, it is impossible to determine whether the imaged spot is located ahead of the beam waist or behind the beam waist.

The three-dimensional object-measurement device 2000 of the present exemplary embodiment therefore irradiates the same measuring point on the object 3000 to be measured with two or more laser beams having different focal points, and obtains image data of each beam. For example, it is assumed that the three-dimensional object-measurement device 2000 use two beams, the laser beam 5010 whose focal length f is changed to 5 cm and the laser beam 5010 whose focal length f is changed to 10 cm. First, the three-dimensional object-measurement device 2000 irradiates the measuring point with the laser beam 5010 whose focal length f is changed to 5 cm for observation. As a result, it is assumed that the angle θ is 10°. In this case, as seen from FIG. 4, the distance to the measuring point is 3.1 cm or 12 cm. Next, the three-dimensional object-measurement device 2000 irradiates the measuring point with the laser beam 5010 whose focal length f is changed to 10 cm for observation. As seen from FIG. 4, when irradiating the object 3000 to be measured with the laser beam 5010 whose focal length f is changed to 10 cm, the angle θ is 20° if the distance to the measuring point is 3.1 cm, and the angle θ is 1.5° if the distance is 12 cm. Accordingly, the three-dimensional object-measurement device 2000 can determine a distance to the measuring point on the object 3000 to be measured by calculating the angle θ when irradiating the laser beam 5010 whose focal length f is changed to 10 cm and determining whether the angle is the above 1.5° or 20°.

The three-dimensional object-measurement device 2000 in the exemplary embodiment 1 calculates a distance to a measuring point by processing image data according to the above measurement principle. Specifically, for example, the three-dimensional object-measurement device 2000 calculate a distance to the object 3000 to be measured by calculating each angle θ viewing a spot on the measuring point from the three-dimensional object-measurement device 2000 for each image data and comparing the angles θ.

A method for measuring a distance to a measuring point on the object 3000 to be measured by the three-dimensional object-measurement device 2000 according to the present exemplary embodiment is not limited to a method using calculation of the angle θ. For example, the three-dimensional object-measurement device 2000 may store a distance-dependency of a pair of "a camera field angle and a spot diameter in image data", and calculate a distance to the measuring point from "the camera field angle and the spot diameter on the image data". In addition, when the camera field angle is fixed, the three-dimensional object-measurement device 2000 may store a distance-dependency of a spot diameter in image data, and calculates a distance to the measuring point from the spot diameter on the image data.

<Details of Configuration>

The laser beam irradiated by the laser beam irradiation unit 2020 is preferably a laser beam invisible to a human eye. An infrared ray beam is one example. The laser beam irradiated by the laser beam irradiation unit 2020 is, however, not limited to a specific kind of beam. The beam may be other invisible beam than an infrared ray or a visible beam. The laser beam irradiation unit 2020 may be any kind capable of irradiating at least one kind of the above various beams.

In addition, the laser beam irradiation unit 2020 may continuously irradiate a laser beam or intermittently irradiate a laser beam. When intermittently irradiating a laser beam, for example, there are a method repeatedly irradiating a laser beam at predetermined timing and a method irradiating a laser beam at the time when receiving a notification from other functional component unit. As a method of receiving a notification from other functional component unit, a notification may be received from the control unit 2080 when the three-dimensional object-measurement device 2000 starts measuring a distance.

The focal length change unit 2040 has an optical element capable of changing a focal length of an irradiated laser beam. A lens is one example of such an optical element.

Figure 5:
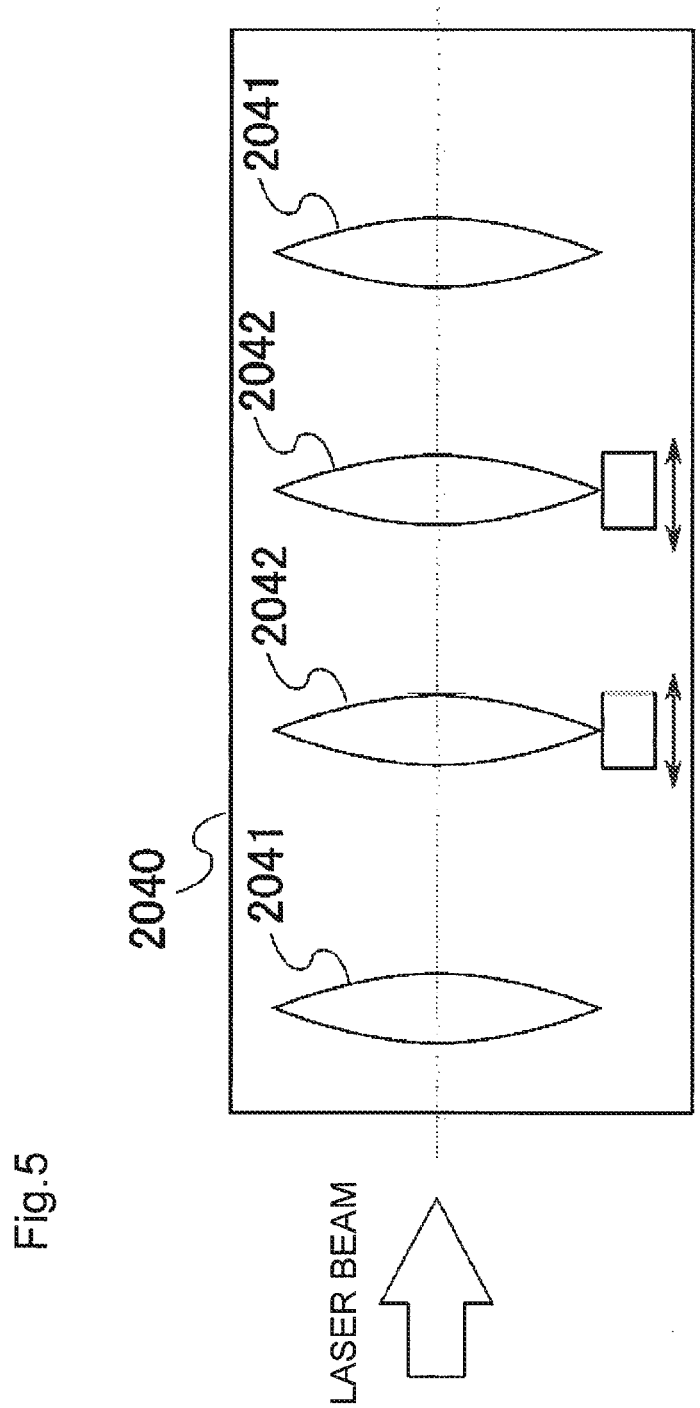
FIG. 5 is a diagram showing a first example of a configuration of a focal length change unit.

A method of configuring the focal length change unit 2040 is not limited to one. For example, there are configurations shown in FIG. 5, FIG. 6, and FIG. 7. The focal length change unit 2040 in FIG. 5 is one example of a configuration having a position-fixed optical element 2041 whose position is fixed and a variable position optical element 2042 whose position is variable. A focal length of a laser beam passing through the focal length change unit 2040 is determined by a position of the variable position optical element 2042. Accordingly, the position of the variable position optical element 2042 is changed based on a value of a focal length set for a passing laser beam.

The position-fixed optical element 2041 is, for example, a lens. The variable position optical element 2042 is configured by combining, for example, a lens and a movable mechanism using a piezoelectric element or the like. In FIG. 5, the focal length change unit 2040 includes two variable position optical elements 2042, however, the number of the variable position optical elements 2042 is not limited to two. The number of the variable position optical elements 2042 that the focal length change unit 2040 has may be one or not less than three.

Figure 6:
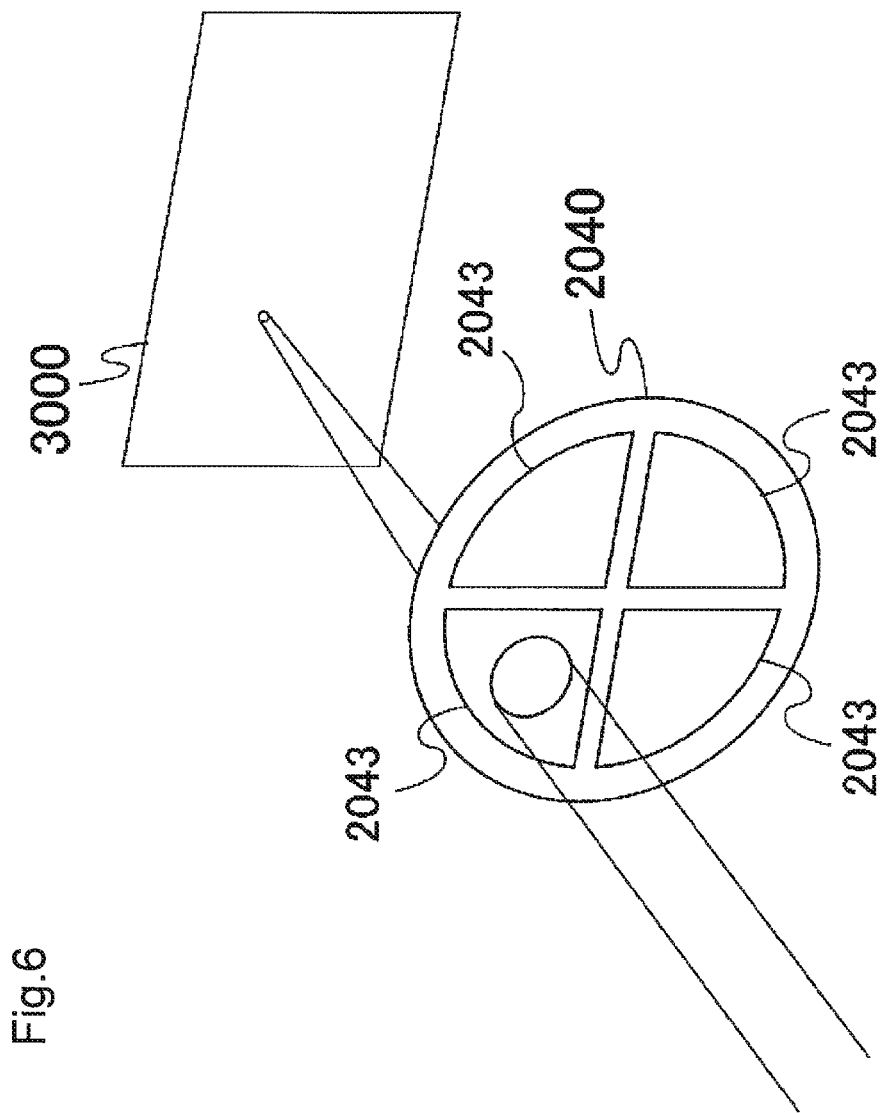
FIG. 6 is a diagram showing a second example of a configuration of the focal length change unit.

The focal length change unit 2040 in FIG. 6 is one example of a configuration having a plurality of optical elements each having a different focal length. In FIG. 6, a plurality of optical elements 2043 each having a different focal length are arranged in a disc-shape. In the focal length change unit 2040 in FIG. 6, a change of a focal length of a laser beam can be conducted by rotating the disc to change the optical element 2043 through which the laser beam is to be passed.

Figure 7:
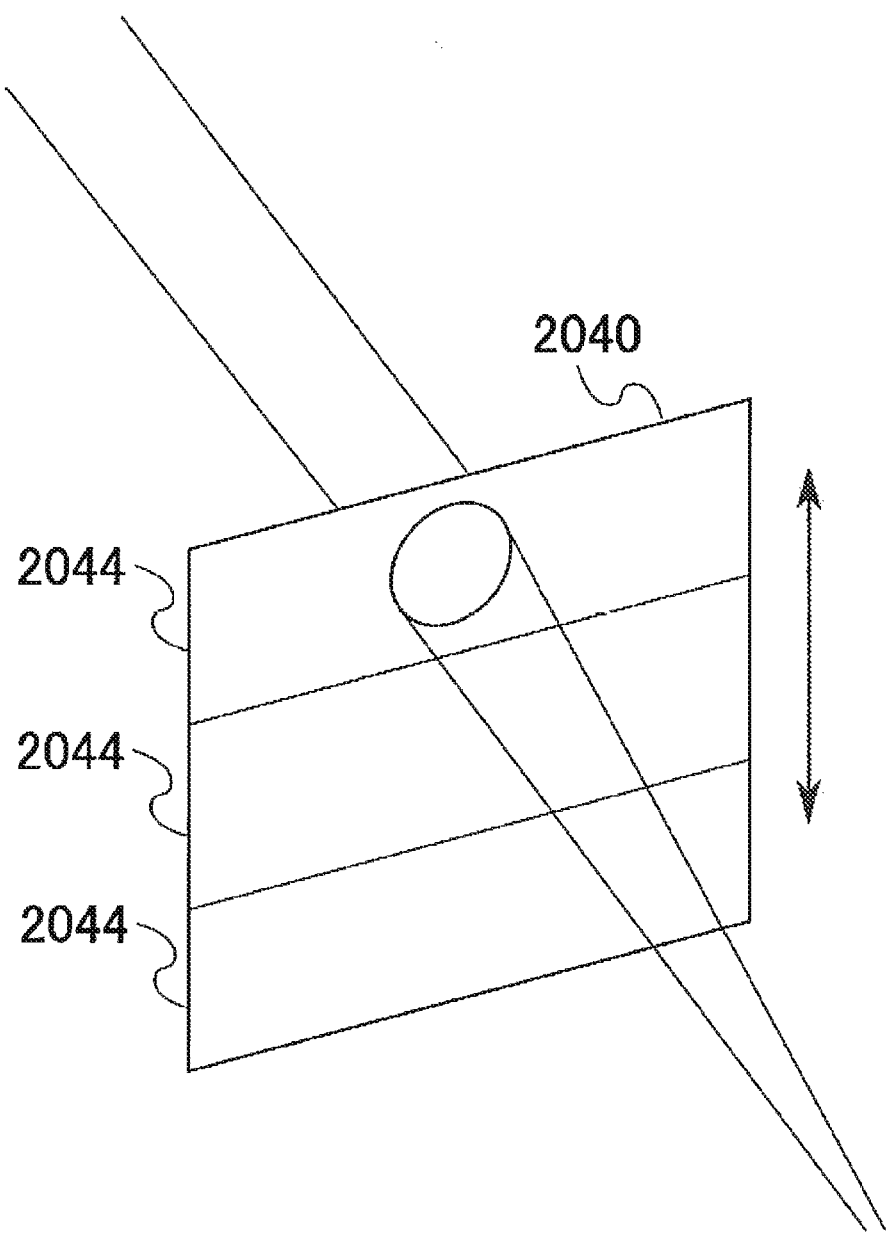
FIG. 7 is a diagram showing a third example of a configuration of the focal length change unit.

Another example of a configuration of the focal length change unit 2040 having a plurality of optical elements each having a different focal length is a configuration shown in FIG. 7. In FIG. 7, optical elements 2044 each having a different focal length are arranged in stripes. In the focal length change unit 2040 in FIG. 7, a change of a focal length of a laser beam is conducted by moving the optical element 2044 arranged in stripes up and down to change the optical element 2044 through which the laser beam is to be passed.

Further, another method of configuring the focal length change unit 2040 is a method of configuring the unit by using an optical element capable of changing a focal length. An example of such an optical element is a lens whose shape can be changed such as a Dynamorph Lens.

The imaging unit 2060 images a spot on a measuring point of the object 3000 to be measured. In other words, the imaging unit 2060 images a reflected light of a laser beam which is irradiated by the laser beam irradiation unit 2020, and exposed to and reflected on the measuring point on the object 3000 to be measured. Specific example of the imaging unit 2060 includes a camera having a CCD (Charge Coupled Device) image sensor, a CMOS (Complementary Metal Oxide Semiconductor) image sensor or the like.

In order to image a spot at a measuring point on the object 3000 to be measured, the imaging unit 2060 is required to receive a reflected light of a laser beam exposed to and reflected on the measuring point on the object 3000 to be measured. For this purpose, the three-dimensional object-measurement device 2000 makes the imaging unit 2060 receive the above reflected light by, for example, changing a position, or an inclination in a vertical direction or a horizontal direction of the imaging unit 2060.

Figure 8:
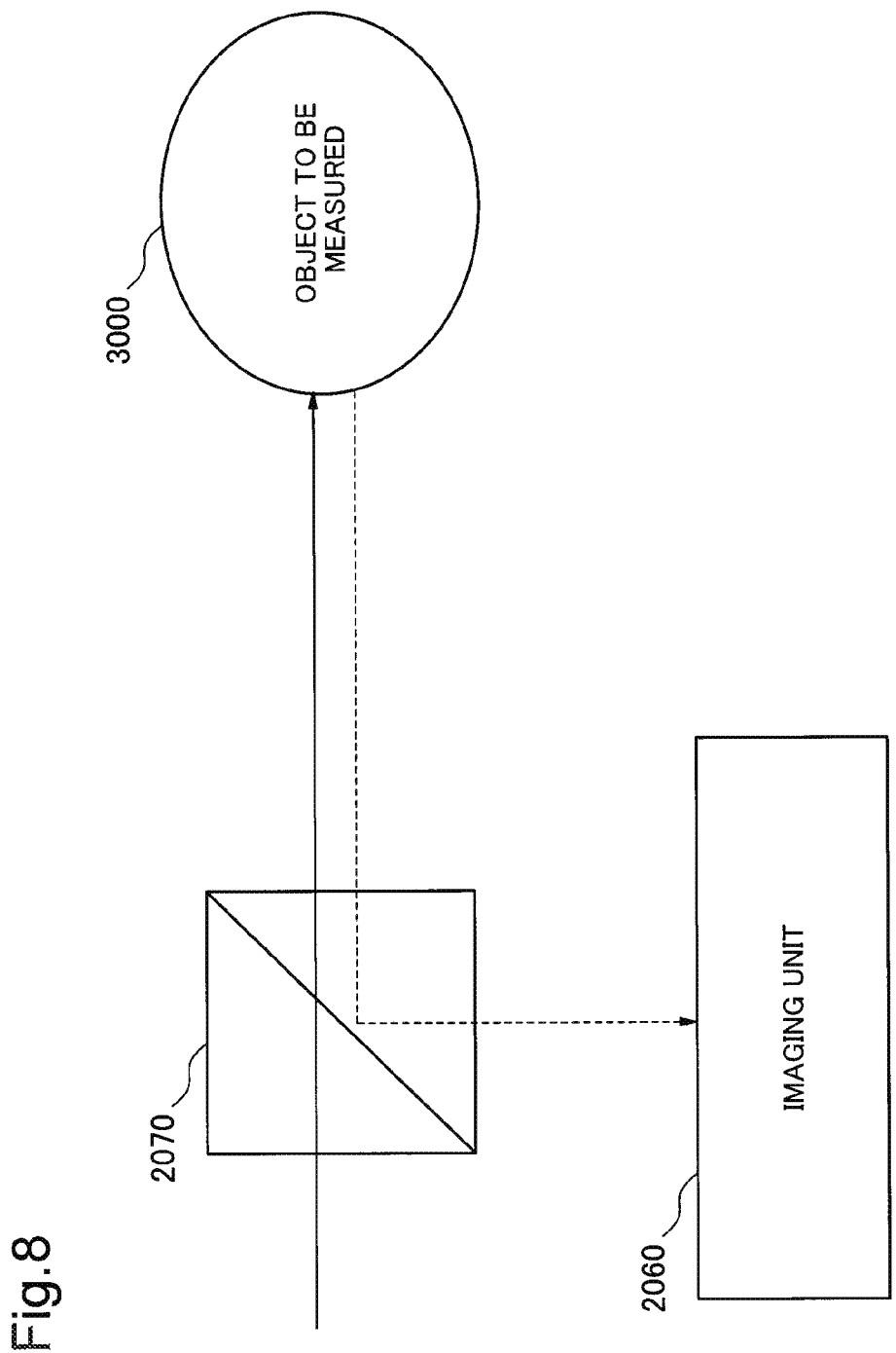
FIG. 8 is a block diagram showing a three-dimensional object-measurement device using a polarizing beam splitter.

In addition, for example, the three-dimensional object-measurement device 2000 has an optical element 2070 which leads the above reflected light toward the direction of the imaging unit 2060 as shown in FIG. 8. In FIG. 8, a solid line arrow represents a laser beam irradiated by the laser beam irradiation unit 2020 and a dotted line arrow represents a reflected light of the above laser beam deposed to and reflected on the object 3000 to be measured. The three-dimensional object-measurement device 2000 makes the imaging unit 2060 receive the above reflected light by changing a direction of the reflected light by the optical element 2070. The optical element 2070 is a polarizing beam splitter, for example. The optical element 2070 leads the above reflected light toward the imaging unit 2060, for example, by passing a laser beam irradiated by the laser beam irradiation unit 2020 and reflecting the reflected light on the object 3000 to be measured toward the direction of the imaging unit 2060.

The control unit 2080 associates the image data imaged by the imaging unit 2060 with the focal length set to the focal length change unit 2040. As the above-described measurement principle, calculation of a distance to a measuring point needs a pair of an angle $\theta$ viewing a spot generated by a laser beam irradiated a measuring point and a focal length set for the laser beam at that time. Then, the control unit 2080 associates the above image data for calculating the angle $\theta$ with the focal length set to the focal length change unit 2040.

The distance calculation unit 2100 calculates a distance to the object 3000 to be measured by processing a plurality of image data associated with the focal length. Specifically, the distance calculation unit 2100 calculates the angle $\theta$ viewing a spot by processing the above image data, and determines a pair of the focal length and the angle $\theta$. Then, the distance calculation unit 2100 calculates the distance to a measuring point on the object 3000 to be measured by comparing each pair of the focal length and the angle $\theta$.

The distance calculation unit 2100 has various occasions to start calculation processing of the distance to the measuring point on the object 3000 to be measured by processing the above image data. The distance calculation unit 2100 may, for example, start the calculation processing upon receiving a notification from the control unit 2080 which has obtained image data necessary for the measurement or start the calculation processing on its own by periodically monitoring existence/non-existence of image data.

<Flow of Distance Measuring Processing>

Figure 9:
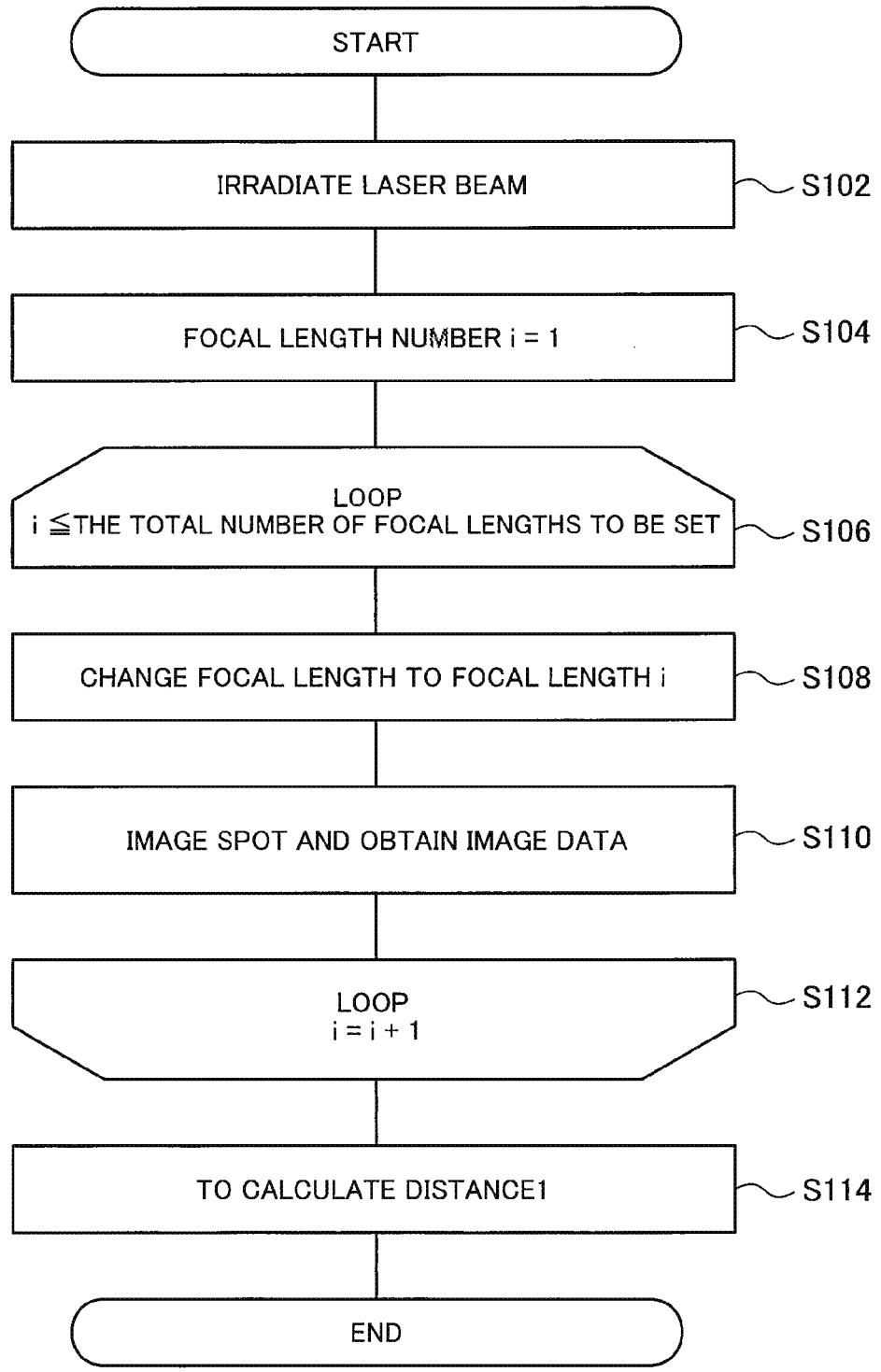
FIG. 9 is a flowchart showing a flow of distance measuring processing executed by the three-dimensional object-measurement device according to the exemplary embodiment 1.

FIG. 9 is a flowchart showing one example of a flow for measuring a distance to the object 3000 to be measured by the three-dimensional object-measurement device 2000.

First, at Step S102, the laser beam irradiation unit 2020 irradiates a laser beam.

At Step S104, the three-dimensional object-measurement device 2000 initializes a focal length number i indicative of a number of a focal length to 1.

Step S106 to Step S112 correspond to loop processing for obtaining image data of a spot on a measuring point of the object 3000 to be measured whose image is imaged with respect to each of different focal lengths i set for the laser beam. When i does not exceed the total number of focal lengths to be set, the processing proceeds to Step S108. When i exceeds the total number of focal lengths to be set, the loop processing is finished to proceed to Step S114.

The total number of focal lengths to be set is two, for example. As described above, this is because for calculating a distance to the object 3000 to be measured, it is necessary to image spots formed on the object 3000 to be measured by two laser beams having different focal lengths, respectively. The total number of focal lengths is not limited to two as long as it is two or more.

At Step S108, the control unit 2080 changes the focal length of the focal length change unit 2040 to the focal length i. The focal length i corresponding to the value of i may be set in advance or set at Step S108 by an operator who operates the three-dimensional object-measurement device 2000.

At Step S110, the control unit 2080 makes the imaging unit 2060 image a spot formed by the laser beam on the object 3000 to be measured and obtain image data.

Step S112 is the end of the loop processing starting at Step S106. The three-dimensional object-measurement device 2000 increments the focal length number i by one and returns to Step S106.

After finishing the above-described loop processing, the three-dimensional object-measurement device 2000 proceeds to Step S114. At Step S114, the distance calculation unit 2100 processes the image data obtained by the above loop processing, and calculates a distance to the measuring point on the object 3000 to be measured.

<Operations and Effects>

With the foregoing configuration, according to the present exemplary embodiment, in the three-dimensional object-measurement device 2000, the focal length change unit 2040 irradiates each of the measuring point on the object 3000 to be measured with a plurality of laser beams which are changed to have different focal lengths; the imaging unit 2060 images spots on the measuring point; the distance calculation unit 2100 calculates a distance to the measuring point on the object 3000 to be measured by processing image data as a result of imaging. By the configurations, the three-dimensional object-measurement device 2000 can realize a small size and measure the object 3000 to be measured located at a short distance with low cost.

Exemplary Embodiment 2

Figure 10:
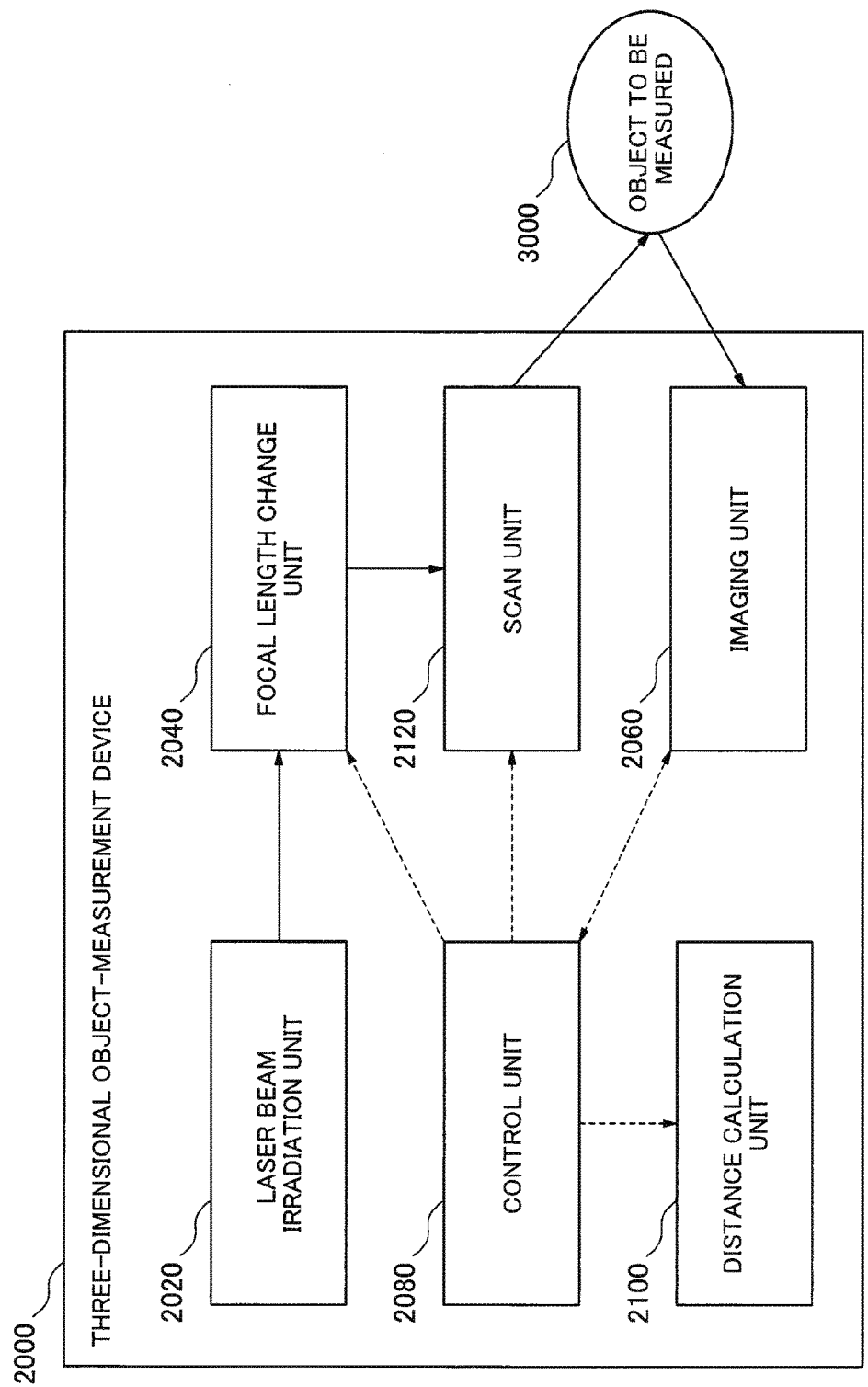
FIG. 10 is a block diagram showing a three-dimensional object-measurement device according to an exemplary embodiment 2 together with an object to be measured.

FIG. 10 is a diagram showing a three-dimensional object-measurement device 2000 according to an exemplary embodiment 2 together with the object 3000 to be measured. Among functional blocks in FIG. 10, functional blocks having the same reference numerals as those in FIG. 1 are assumed to have the same functions as those of the functional blocks having the same reference numerals in FIG. 1 unless otherwise noted, and description thereof is omitted. In addition, because meaning of the arrow is also the same as that of FIG. 1, its description will be omitted.

The three-dimensional object-measurement device 2000 according to the exemplary embodiment 2 further has a scan unit 2120. The scan unit 2120 changes an irradiation direction of a laser beam irradiated by the laser beam irradiation unit 2020.

The three-dimensional object-measurement device 2000 measures distances to a plurality of measuring points on the object 3000 to be measured. Specifically, first, the control unit 2080 sets a focal length of the focal length change unit 2040 to a first focal length. The control unit 2080 irradiates each of the above plurality of measuring points with the laser beams irradiated by the laser beam irradiation unit 2020 by controlling the scan unit 2120. The imaging unit 2060 images a spot at each of the above plurality of measuring points, and generates image data. Next, the control unit 2080 sets the focal length of the focal length change unit 2040 to a second focal length different from the first focal length. Then, the control unit 2080 generates image data imaging the spots at the above plurality of measuring points.

The distance calculation unit 2100 calculates a distance to each of the above plurality of measuring points by processing the above plurality of image data.

In the manner as described above, when measuring each of distances to the plurality of measuring points on the object 3000 to be measured, the three-dimensional object-measurement device 2000 images spots at the above plurality of measuring points, with the focal length of the focal length change unit 2040 set to the first focal length. Thereafter, the three-dimensional object-measurement device 2000 changes the focal length of the focal length change unit 2040 to the second focal length different from the first focal length and further images the spots at the above plurality of measuring points. Then, the distance calculation unit 2100 calculates each of distances to the above plurality of measuring points by processing a plurality of above-generated image data. By these manner, because the three-dimensional object-measurement device 2000 can reduce the number of changes of a focal length made by the focal length change unit 2040 compared with that of a case where a distance to an individual measuring point is measured one by one by the three-dimensional object-measurement device 2000 in the exemplary embodiment 1, time required for measuring distances to the plurality of measuring points is reduced. In addition, because distances to the plurality of measuring points can be measured at once, a load of an operator who operates the three-dimensional object-measurement device 2000 is reduced.

In the following, the present exemplary embodiment will be described in detail.

<Details of Configuration>

Figure 11:
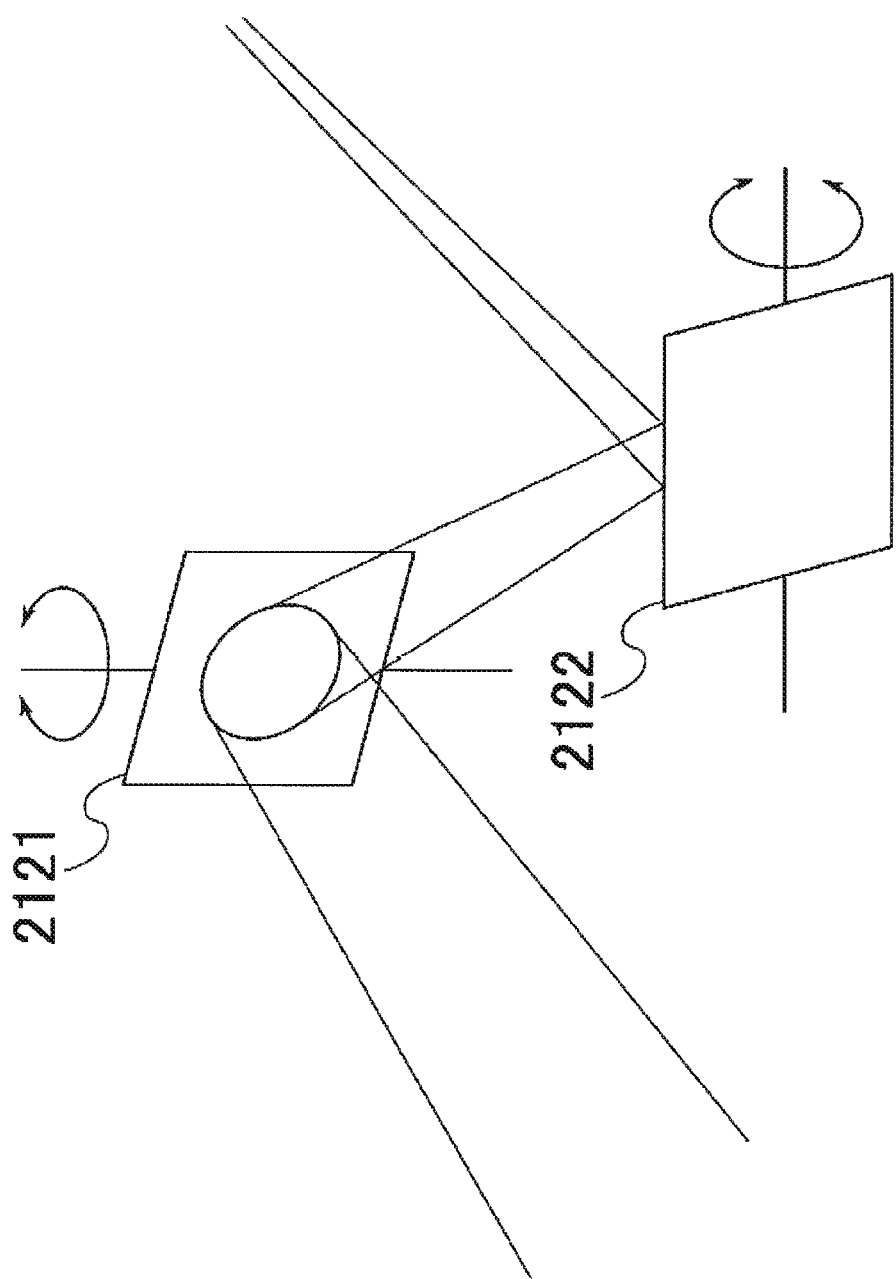
FIG. 11 is a diagram showing an example of a configuration of a scan unit.

The scan unit 2120 changes an irradiation direction of a laser beam irradiated by the laser beam irradiation unit 2020. The scan unit 2120 includes a horizontal direction scan unit 2121 which changes an irradiation direction of a laser beam to a horizontal direction and a vertical direction scan unit 2122 which changes the same to a vertical direction as shown in FIG. 11, for example. The horizontal direction scan unit 2121 and the vertical direction scan unit 2122 are mirrors which reflect a laser beam, for example. In FIG. 11, a rotation axis of the horizontal direction scan unit 2121 and a rotation axis of the vertical direction scan unit 2122 are orthogonal to each other. First, the scan unit 2120 changes an irradiation direction of a laser beam to a desired horizontal direction by reflecting the laser beam on the horizontal direction scan unit 2121. Next, the scan unit 2120 changes an irradiation direction of the laser beam to a desired vertical direction by reflecting the laser beam on the vertical direction scan unit 2122. Thus, the scan unit 2120 irradiates a desired position on the object 3000 to be measured with the laser beam. The order of laser beam reflected on the horizontal direction scan unit 2121 and the vertical direction scan unit 2122 may be reversed.

The configuration of the scan unit 2120 is not limited to that of FIG. 11. Another example of the configuration of the scan unit 2120 is a configuration having one mirror rotatable around vertical and horizontal directions so that one point is each of axes (not shown).

To be strictly considered, when the scan unit 2120 is operated at a high speed, a laser beam irradiation position might deviates slightly from the measuring point. Distance calculation in the distance calculation unit 2100 is desirably conducted by calculating a distance to a measuring point taking this deviation into consideration.

Figure 12:
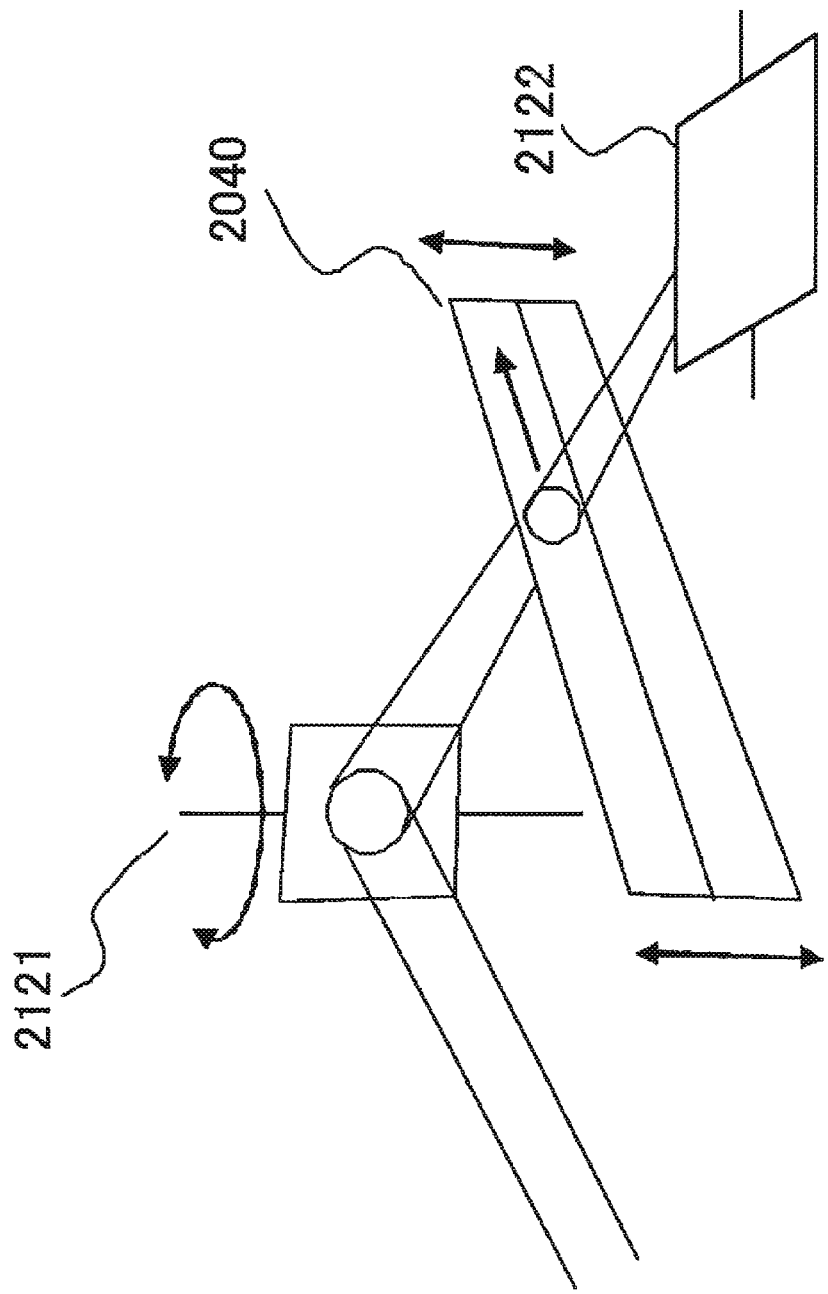
FIG. 12 is a diagram showing an example of a configuration of a scan unit having a focal length change unit therein.

In the present exemplary embodiment, the focal length change unit 2040 can be configured as a part of the scan unit 2120. One example is a configuration shown in FIG. 12. In FIG. 12, the focal length change unit 2040 is located between the horizontal direction scan unit 2121 and the vertical direction scan unit 2122.

The configuration of the focal length change unit 2040 provided in the scan unit 2120 is preferably the configuration described in the exemplary embodiment 1 with reference to FIG. 7, for example. This is because the size of the three-dimensional object-measurement device 2000 can be further reduced since a space between the horizontal direction scan unit 2121 and the vertical direction scan unit 2122 can be narrowed. Also in a case where the focal length change unit 2040 is provided in the scan unit 2120, the configuration of the focal length change unit 2040 is not limited to that shown in FIG. 7. The configuration of the focal length change unit 2040 allows various configurations including those shown in FIG. 5 and FIG. 6.

In the present exemplary embodiment, the three-dimensional object-measurement device 2000 may have a plurality of focal length change units 2040. In this case, the control unit 2080 can change a focal length of a laser beam by operating the scan unit 2120 and switching the focal length change unit 2040 through which a laser beam passes. Thus, the three-dimensional object-measurement device 2000 enables a changeable range of a focal length to be expanded by switching the plurality of focal length change units 2040 for use. Depending on the configuration of the focal length change unit 2040, a method of changing a focal length by switching the focal length change unit 2040 to be used through control of the scan unit 2120 may realize focal length change at a higher speed than a method of changing a focal length by controlling a focal length changing mechanism provided in the focal length change unit 2040 in some cases.

<Flow of Distance Measuring Processing>

Figure 13:
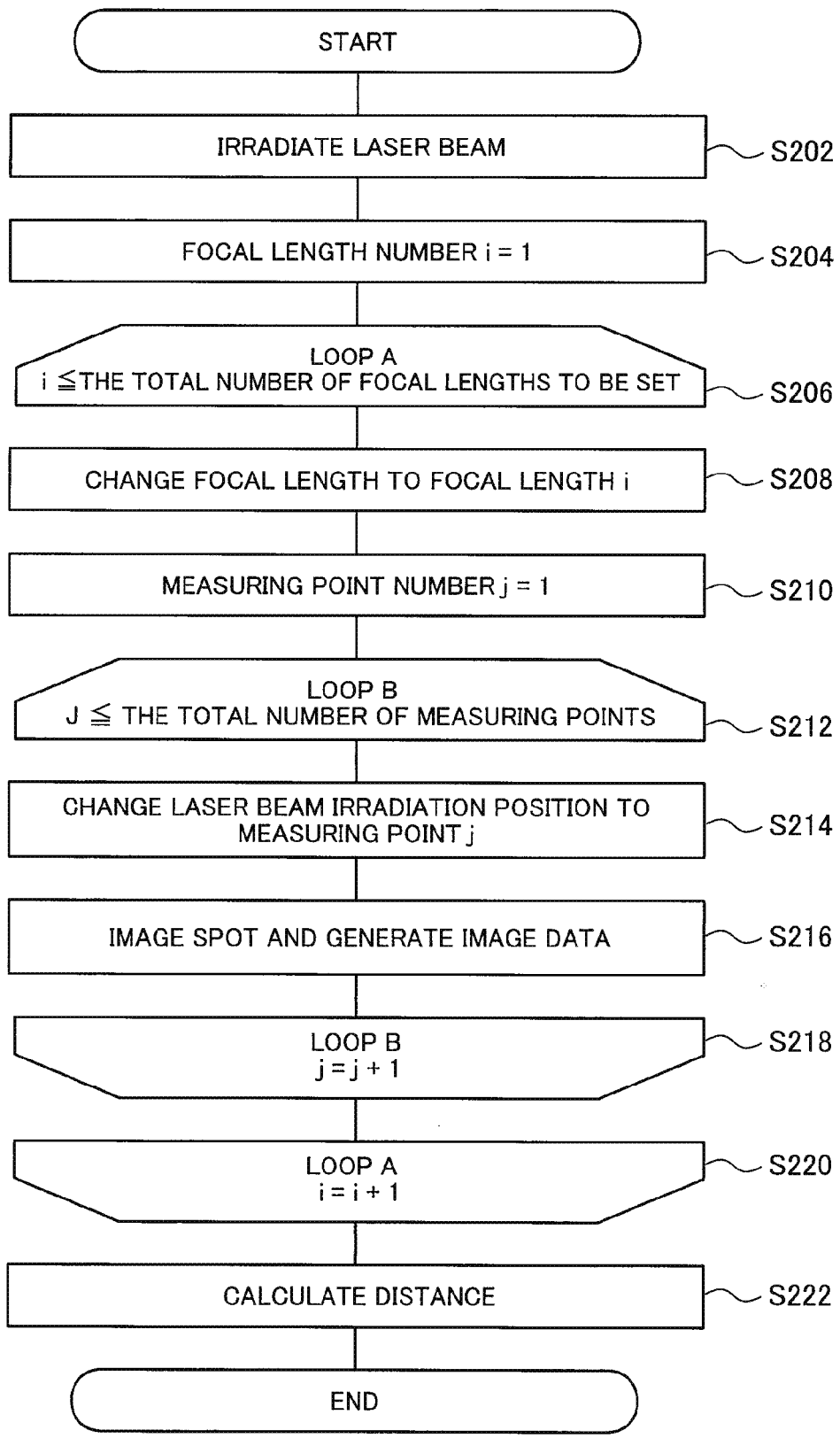
FIG. 13 is a flowchart showing a flow of distance measuring processing executed by the three-dimensional object-measurement device according to the exemplary embodiment 2.

FIG. 13 is a flowchart showing a flow of calculating a distance to each of a plurality of measuring points on the object 3000 to be measured by the three-dimensional object-measurement device 2000.

First, at Step S202, the laser beam irradiation unit 2020 irradiates a laser beam. Then, the three-dimensional object-measurement device 2000 initializes a focal length number i to 1 at Step S204.

Step S206 to Step S220 is loop processing A in which loop processing B is repeatedly executed while changing a focal length of a laser beam. The loop processing B is processing executed at Step S212 to Step S218, which processing is to image a spot at each measuring point with a focal length of a laser beam fixed. Accordingly, the three-dimensional object-measurement device 2000 images a spot at each measuring point with respect to each focal length by executing the loop processing A.

First, at Step S206, the three-dimensional object-measurement device 2000 checks whether the focal length number i is not larger than the total number of focal lengths to be set. When the focal length number i is not larger than the total number of focal lengths to be set, the three-dimensional object-measurement device 2000 proceeds to Step S208. When the focal length number i is larger than the total number of focal lengths to be set, the three-dimensional object-measurement device 2000 proceeds to Step S222 and calculates a distance to each measuring point.

At Step S208, the laser beam irradiation unit 2020 sets the focal length of the focal length change unit 2040 to the focal length i. Correspondence between the focal length number i and the focal length may be set in advance as in the exemplary embodiment 1 or may be set each time by an operator who operates the three-dimensional object-measurement device 2000.

The three-dimensional object-measurement device 2000 initializes a measuring point number j to 1 at Step S210.

Step S212 is front processing of the loop processing B. As described above, the loop processing B is processing of imaging a spot at each measuring point with a focal length of a laser beam fixed. At Step S212, the three-dimensional object-measurement device 2000 checks whether the measuring point number j is not larger than the total number of measuring points. When the measuring point number j is not larger than the total number of measuring points, the three-dimensional object-measurement device 2000 proceeds to Step S214. When j is larger than the total number of measuring points, the three-dimensional object-measurement device 2000 proceeds to Step S220.

At Step S214, the control unit 2080 sets a laser beam irradiation position to the measuring point j by controlling the scan unit 2120. Because it is necessary that the measuring point j is common among each focal length i, correspondence between the measuring point number j and the measuring point j is preferably given in advance. However, the operator can set it each time.

At Step S216, the control unit 2080 obtains image data imaging a spot at the measuring point j by controlling the imaging unit 2060.

Step S218 is the end of the loop processing B. The three-dimensional object-measurement device 2000 increments j by one, and returns to Step S212.

When ending the loop processing B, the three-dimensional object-measurement device 2000 proceeds to Step S220. Step S220 is the end of the loop processing A. The three-dimensional object-measurement device 2000 increments i by one, and returns to Step S206.

When the three-dimensional object-measurement device 2000 ends the loop processing A, it proceeds to Step S222. At Step S222, the distance calculation unit 2100 calculates a distance to each measuring point j by processing the obtained image data. The distance calculation unit 2100 calculates a distance to each measuring point j by, for example, dividing the obtained image data into groups for each measuring point j and applying the measurement principle as described in the exemplary embodiment 1 to each group.

<Functions and Effects>

With the foregoing configuration, according to the present exemplary embodiment, the three-dimensional object-measurement device 2000 measures each of distances to a plurality of measuring points on the object 3000 to be measured. As a result, the three-dimensional object-measurement device 2000 of the present exemplary embodiment achieves the same functions and effects as those of the exemplary embodiment 1. Further, the three-dimensional object-measurement device 2000 of the present exemplary embodiment can reduce the number of changes of a focal length by the focal length change unit 2040 compared with the three-dimensional object-measurement device 2000 according to the exemplary embodiment 1. Thus, time required for measuring distances to the plurality of measuring points is reduced. In addition, the three-dimensional object-measurement device 2000 of the present exemplary embodiment can measure distances to the plurality of measuring points simultaneously. Thus, a load on an operator who operates the three-dimensional object-measurement device 2000 is reduced.

Exemplary Embodiment 3

A configuration of a three-dimensional object-measurement device 2000 according to an exemplary embodiment 3 is represented, for example, by FIG. 10 similarly to the three-dimensional object-measurement device 2000 according to the exemplary embodiment 2. Therefore, description of the functional blocks is omitted except one in particular requiring its description.

The three-dimensional object-measurement device 2000 of the exemplary embodiment 2 generates image data for each focal length and each measuring point. As a result, one spot is imaged on one image data. In other words, the three-dimensional object-measurement device 2000 of the exemplary embodiment 2 calculates a distance to each measuring point by generating a combination of "a focal length, a measuring point, and image data obtained by imaging a spot at one measuring point". On the other hand, the three-dimensional object-measurement device 2000 according to the present exemplary embodiment images spots at a plurality of measuring points on the object 3000 to be measured collectively as one image with respect to a laser beam of each focal length. As a result, a plurality of spots is imaged on one image data. In other words, the three-dimensional object-measurement device 2000 according to the exemplary embodiment 3 generates a combination of "a focal length and image data obtained by imaging spots at a plurality of measuring points".

For generating such image data as described above, the imaging unit 2060 according to the present exemplary embodiment includes a function of maintaining an imaging state. It is assumed that, for example, the imaging unit 2060 is a camera which receives light by a CCD image sensor and records the light received by the CCD image sensor as an image. In this case, the imaging unit 2060 can record a plurality of spots in one image by maintaining the CCD image sensor in a light reception state while imaging a plurality of spots.

The distance calculation unit 2100 calculates a distance of each of a plurality of measuring points by processing the above image data generated one by one for each focal length.

In the manner described above, the three-dimensional object-measurement device 2000 generates one image data imaging spots at a plurality of measuring points on the object 3000 to be measured collectively with respect to a laser beam of each focal length. Then, the three-dimensional object-measurement device 2000 calculates a distance to each of the above plurality of measuring points by processing the image data. As a result, because the number of executions of image data generation processing is reduced, time required for measurement is further reduced. In addition, because the number of image data generated is reduced, an amount of calculation resources necessary for the measuring processing is reduced.

In the following, the present exemplary embodiment will be described in detail.

<Principle of Distance Calculation by Using Image Data Imaging a Plurality of Spots Collectively>

The present exemplary embodiment calculates each of distances to a plurality of measuring points by imaging spots at the plurality of measuring points for each focal length on one image data and processing the image data. For this purpose, it is necessary to calculate an angle θ viewing a spot at each measuring point by using the one image data. A method therefor will be described in the following.

First, when spots at a plurality of measuring points does not overlap with each other, an angle θ viewing each spot can be calculated by independently processing each spot.

Figure 14:
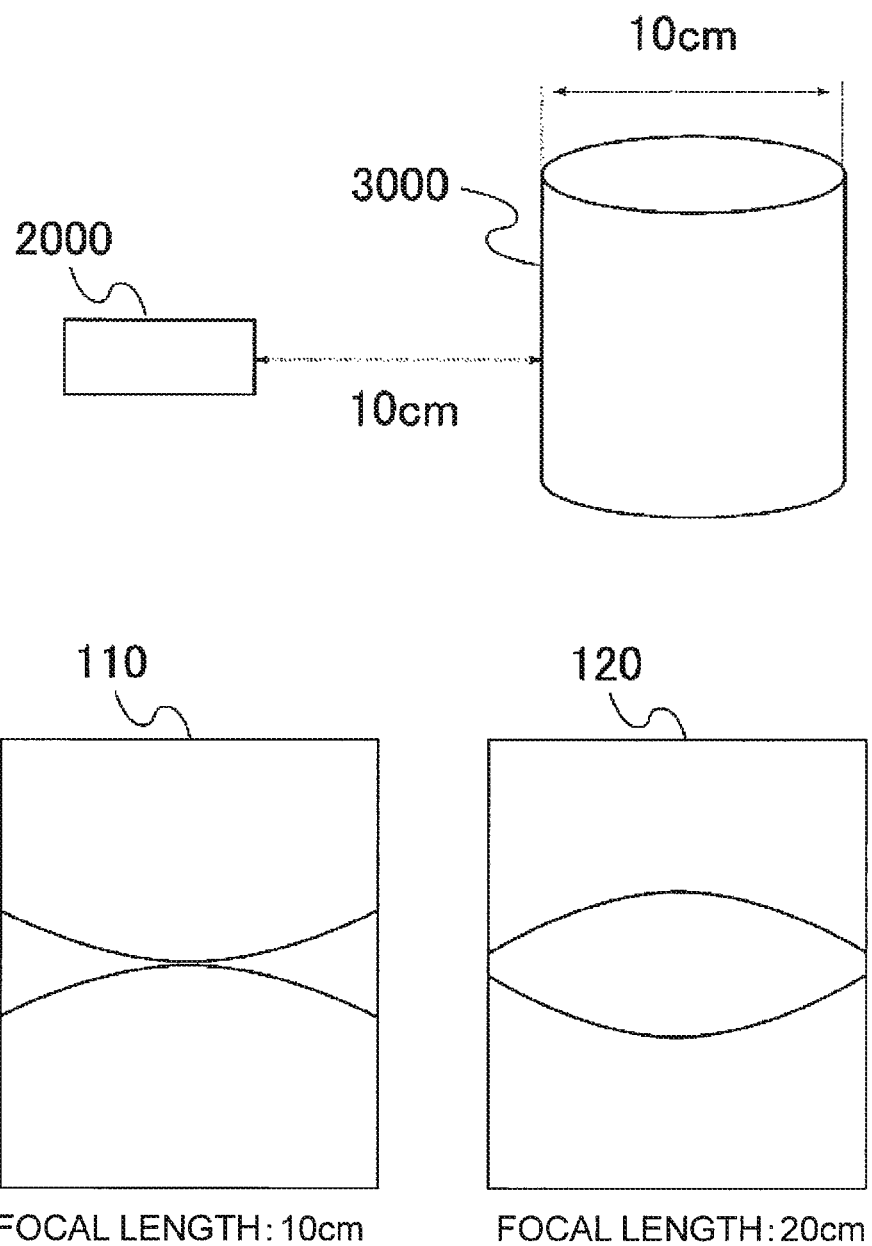
FIG. 14 is a diagram showing how a plurality of spots overlapping with each other in a horizontal direction are imaged and image data as a result of the imaging.

Next, description will be made of a method of respectively calculating an angle θ viewing each spot when spots overlap with each other. FIG. 14 shows, for example, an aspect of measurement and an imaging result when a plurality of measuring points on the object 3000 to be measured are continuous in a horizontal direction. The three-dimensional object-measurement device 2000 is located at a position 10 cm, as the shortest distance, away from the object 3000 to be measured having a cylindrical shape. Then, the three-dimensional object-measurement device 2000 continuously irradiates the object 3000 to be measured with a laser beam in the horizontal direction and images a spot.

Image data 110 is image data obtained when the focal length is 10 cm and image data 120 is image data obtained when the focal length is 20 cm. In this case, because spots at the respective measuring points overlap with each other in the horizontal direction, no spot forms a circle. Calculation of the angle θ viewing a spot, however, does not require the entire spot. This is because as shown in FIG. 2B, the angle θ viewing a spot corresponds to a diameter portion of the spot. Accordingly, even if the spots overlap with each other, the angle θ viewing each spot can be calculated when a diameter portion of the spot is found. In a case of FIG. 14, for example, since respective spots in the image data 110 and the image data 120 does not overlap with each other in the vertical direction, the angle θ can be calculated by using a diameter portion in the vertical direction of each spot. In addition, even when a spot in image data does not include a diameter portion, the angle θ can be calculated from an imaged cross-section of the spot. When the spot has a circular shape, for example, such a method is employed of reconstructing an entire circle from a part of the circle appearing in the image data and calculating the angle θ using the reconstructed circle.

According to the above-described principle, the distance calculation unit 2100 of the present exemplary embodiment processes one image data imaged for each focal length, and calculates a distance to each of a plurality of measuring points on the object 3000 to be measured. When imaging two pieces of image data shown in the example of FIG. 14, for example, the distance calculation unit 2100 first calculates the angle θ at each measuring point with respect to image data in a case of a focal length of 10 cm. Next, the distance calculation unit 2100 calculates the angle θ at each measuring point with respect to image data in a case of a focal length of 20 cm. Then, the distance calculation unit 2100 calculates a distance to each measuring point by comparing each two angles θ calculated at each measuring point.

As described above, although imaging one image data for each focal length enables distance measurement, a plurality of image data may be generated for each focal length. This is expected to provide such an effect as an increase in measurement precision.

<Flow of Distance Measuring Processing>

Figure 15:
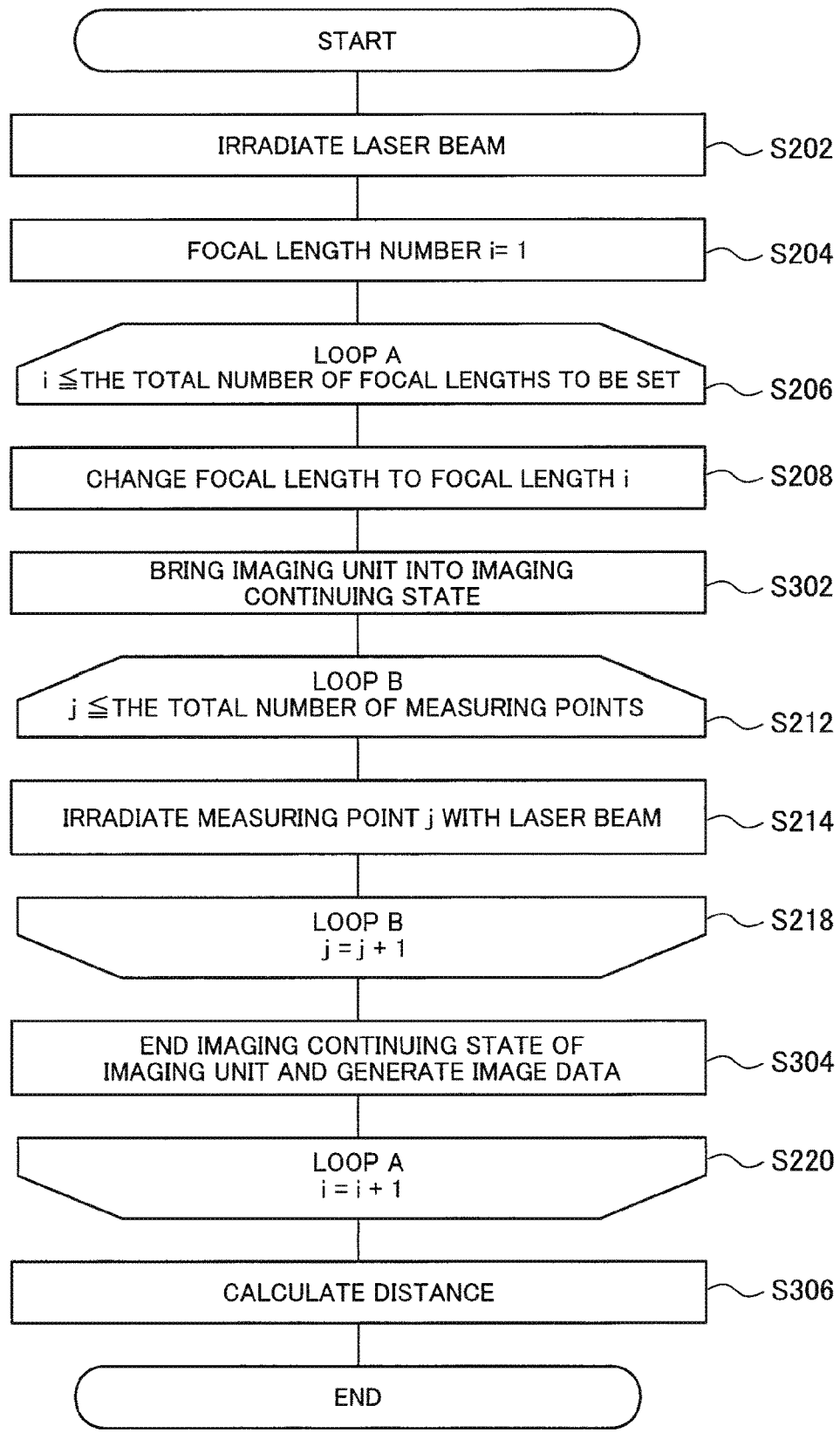
FIG. 15 is a flowchart showing a flow of distance measuring processing executed by a three-dimensional object-measurement device according to an exemplary embodiment 3.

FIG. 15 illustrates a flow of processing of calculating a distance to each of a plurality of measuring points on the object 3000 to be measured in the present exemplary embodiment. In FIG. 15, at the respective steps excluding Step S302, Step S304 and Step S306, the same processing as that of the respective steps in FIG. 13 is executed. Therefore, detailed description of other steps than Step S302, Step S304 and Step S306 will be omitted.

After finishing Step S202 and Step S204, the three-dimensional object-measurement device 2000 starts the loop processing A. In the loop processing A in FIG. 15, similarly to the loop processing A in FIG. 13, the loop processing B is executed with respect to each focal length i.

At Step S302 before starting the loop processing B, the control unit 2080 fixes the imaging unit 2060 to an imaging continuing state. The imaging continuing state of the imaging unit 2060 is, in the above-described example, a state where recording video is continued with a diaphragm of a camera opened. The imaging unit 2060 records, as one image data, video of images picked up from the start of the imaging continuing state until its end.

In the loop processing B, the control unit 2080 irradiates each measuring point j with a laser beam.

After finishing the loop processing B, the control unit 2080 ends the imaging state of the imaging unit 2060 at Step S304.

As described in the foregoing, executing the loop processing B while maintaining the imaging unit 2060 in the imaging continuing state results in imaging spots at all the measuring points j collectively into one image data. In other words, a combination is generated of "a focal length i and image data imaging spots at all the measuring points".

The distance calculation unit 2100 calculates a distance to each of the plurality of measuring points on the object 3000 to be measured by processing the pair of "a focal length i and image data imaging spots at all the measuring points" generated for each focal length i at Step S306.

<Functions and Effects>

With the foregoing configuration, according to the present exemplary embodiment, the three-dimensional object-measurement device 2000 generates one image data imaging spots at a plurality of measuring points on the object 3000 to be measured collectively with respect to a laser beam of each focal length, and calculates a distance to each of the plurality of above measuring points by processes the image data thereof. As a result, first, the three-dimensional object-measurement device 2000 achieves about the same functions and effects as those of the three-dimensional object-measurement device 2000 of the exemplary embodiment 2. Further, the three-dimensional object-measurement device 2000 of the present exemplary embodiment reduces the number of executions of image data generation processing to be less than that of a case of the three-dimensional object-measurement device 2000 of the exemplary embodiment 2. As a result, time required for measurement is further reduced. In addition, the three-dimensional object-measurement device 2000 of the present exemplary embodiment reduces the number of generated image data. As a result, an amount of calculation resources necessary for the processing is reduced.

Exemplary Embodiment 4

Figure 16:
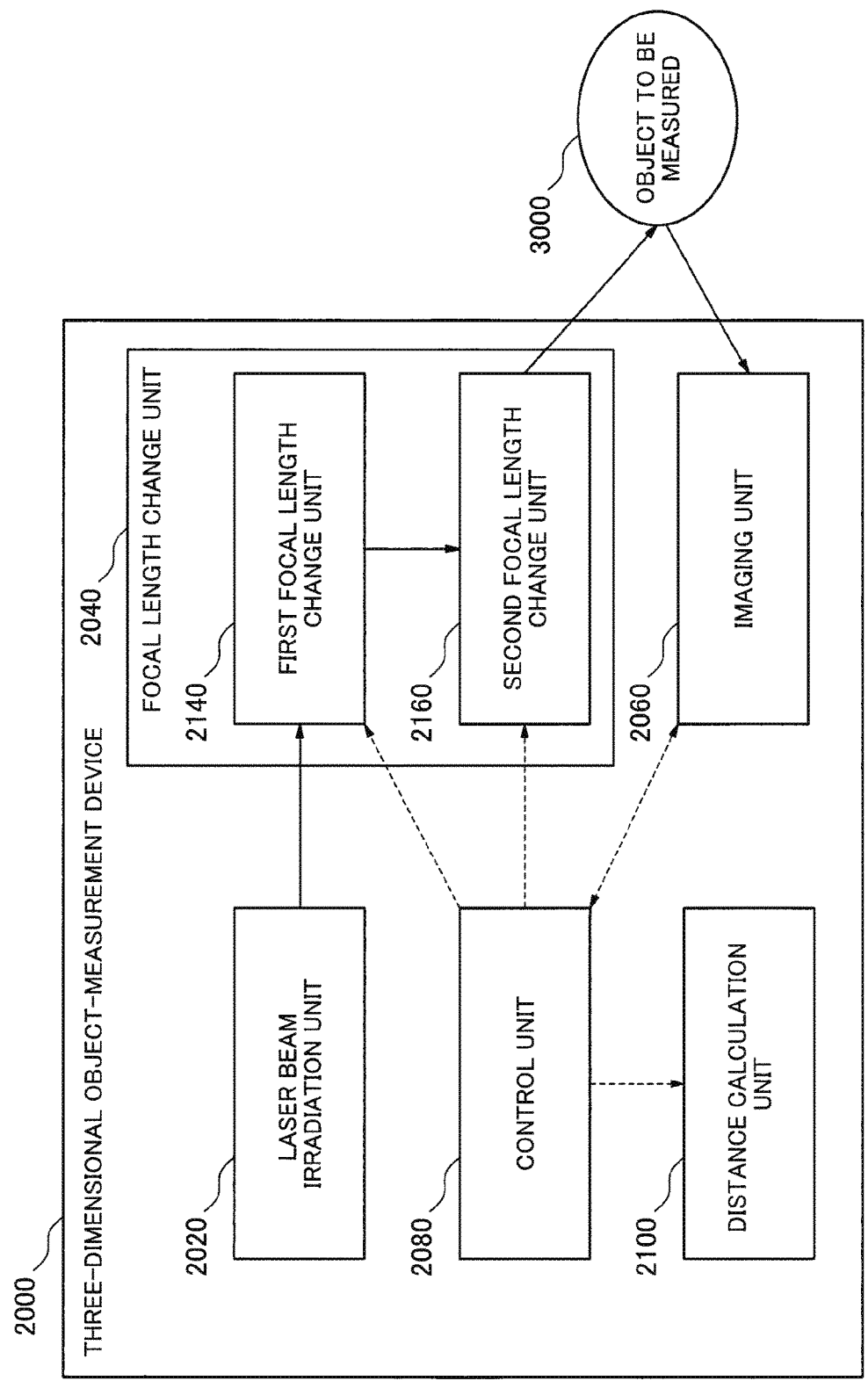
FIG. 16 is a block diagram showing a three-dimensional object-measurement device according to an exemplary embodiment 4 together with an object to be measured.

FIG. 16 is a diagram showing a three-dimensional object-measurement device 2000 according to an exemplary embodiment 4 together with the object 3000 to be measured. Among functional blocks in FIG. 16, functional blocks having the same reference numerals as those in FIG. 1 are assumed to have the same functions as those of the functional blocks having the same reference numerals in FIG. 1 as long as no description, and description thereof is omitted. In addition, because meaning of the arrow is also the same as that of FIG. 1, its description will be omitted.

The focal length change unit 2040 according to the present exemplary embodiment includes a first focal length change unit 2140 and a second focal length change unit 2160. The first local length change unit 2140 changes a focal length of a laser beam irradiated by the laser beam irradiation unit 2020 with respect to a first axis which is one axis on a plane perpendicular to a laser beam irradiation direction. Then, with respect to a second axis on the plane perpendicular to the laser beam irradiation direction and different from the first axis, the second local length change unit 2160 changes a focal length of the laser beam whose focal length is changed with respect to the first axis by the first local length change unit 2140.

The control unit 2080 sets different focal lengths to the first local length change unit 2140 and the second local length change unit 2160. By this manner, spot diameters of a spot appearing on measuring points on the object 3000 to be measured respectively vary with the above two axes. The distance calculation unit 2100 calculates a distance to the measuring point on the object 3000 to be measured based on image data imaging a spot having different spot diameters for the above two axes. Accordingly, in the present exemplary embodiment, unlike the exemplary embodiments 1 to 3 in which different image data is generated for each focal length, a spot of a laser beam changed to have two focal lengths is recorded in one image data.

In the manner as described above, the three-dimensional object-measurement device 2000 according to the present exemplary embodiment makes a laser beam changed to have different focal lengths for different axes by the first local length change unit 2140 and the second local length change unit 2160 be a measuring point on the object 3000 to be measured. Then, the three-dimensional object-measurement device 2000 calculates a distance to the measuring point based on image data imaging the spot at the measuring point. This eliminates the need of generating image data for each focal length. As a result, effects of reduction in time required for measurement and reduction in calculation resources required for measurement can be obtained.

In the following, details of the present exemplary embodiment will be described.

<Details of Configuration>

Figure 17:
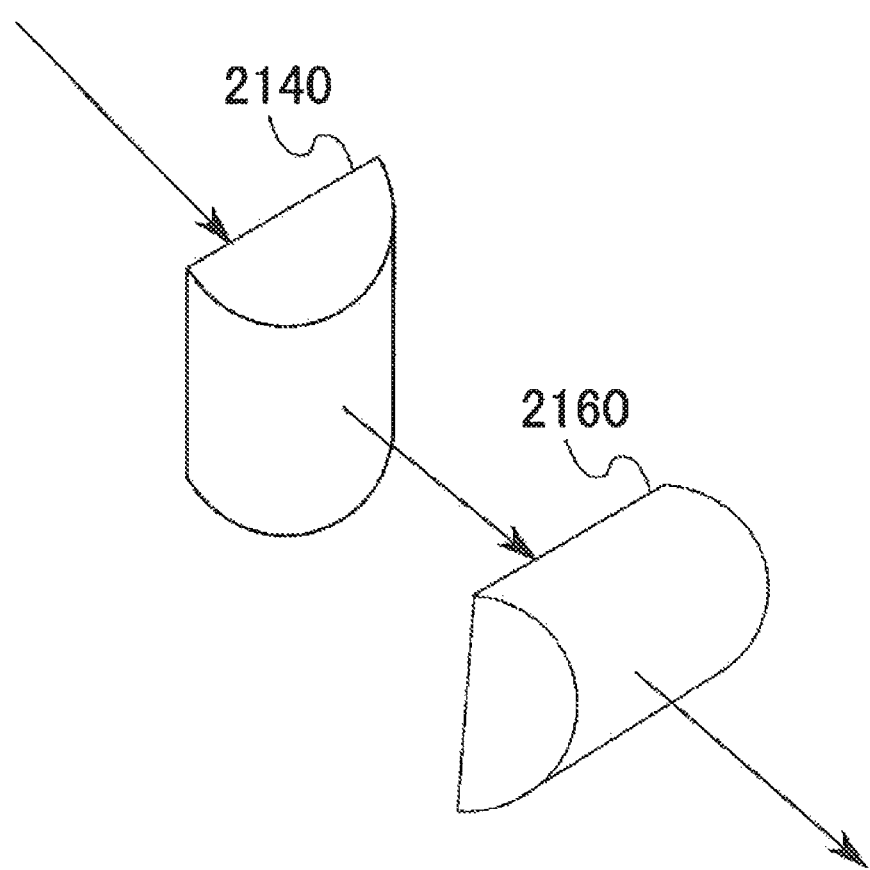
FIG. 17 is a diagram showing an example of a configuration of a focal length change unit according to the exemplary embodiment 4.

The configuration of the focal length change unit 2040 having the first focal length change unit 2140 and the second focal length change unit 2160 is, for example, as shown in FIG. 17. The first focal length change unit 2140 and the second focal length change unit 2160 are configured with a cylindrical lens, for example.

<Principle of Distance Measurement According to Present Exemplary Embodiment>

The three-dimensional object-measurement device 2000 according to the present exemplary embodiment irradiates a measuring point on the object 3000 to be measured with a laser beam changed to have different focal lengths for the above-described first axis and second axis, and generates image data imaging the spot. Then, the three-dimensional object-measurement device 2000 calculates a distance to the above measuring point based on the image data imaging the one spot. Principle will be described of the calculation of a distance to a measuring point based on thus obtained one image data in the following.

First, as described in the exemplary embodiment 1, a distance to a measuring point on the object 3000 to be measured can be calculated by calculating two or more pairs of "a focal length of a laser beam and an angle θ viewing a spot on a measuring point" and comparing them. Then, as described in the exemplary embodiment 3, the angle θ viewing a spot can be calculated from a spot diameter on the image data. Accordingly, if two pairs of "a focal length and a spot diameter in image data" can be obtained from one spot, a distance to a measuring point can be calculated based on one image data imaging one spot.

The three-dimensional object-measurement device 2000 according to the present exemplary embodiment obtains two pairs of "a focal length and a spot diameter on image data" from one spot on the image data by changing a focal length of a laser beam to be different with the first axis and the second axis. A method therefor will be described in the following.

Figure 18:
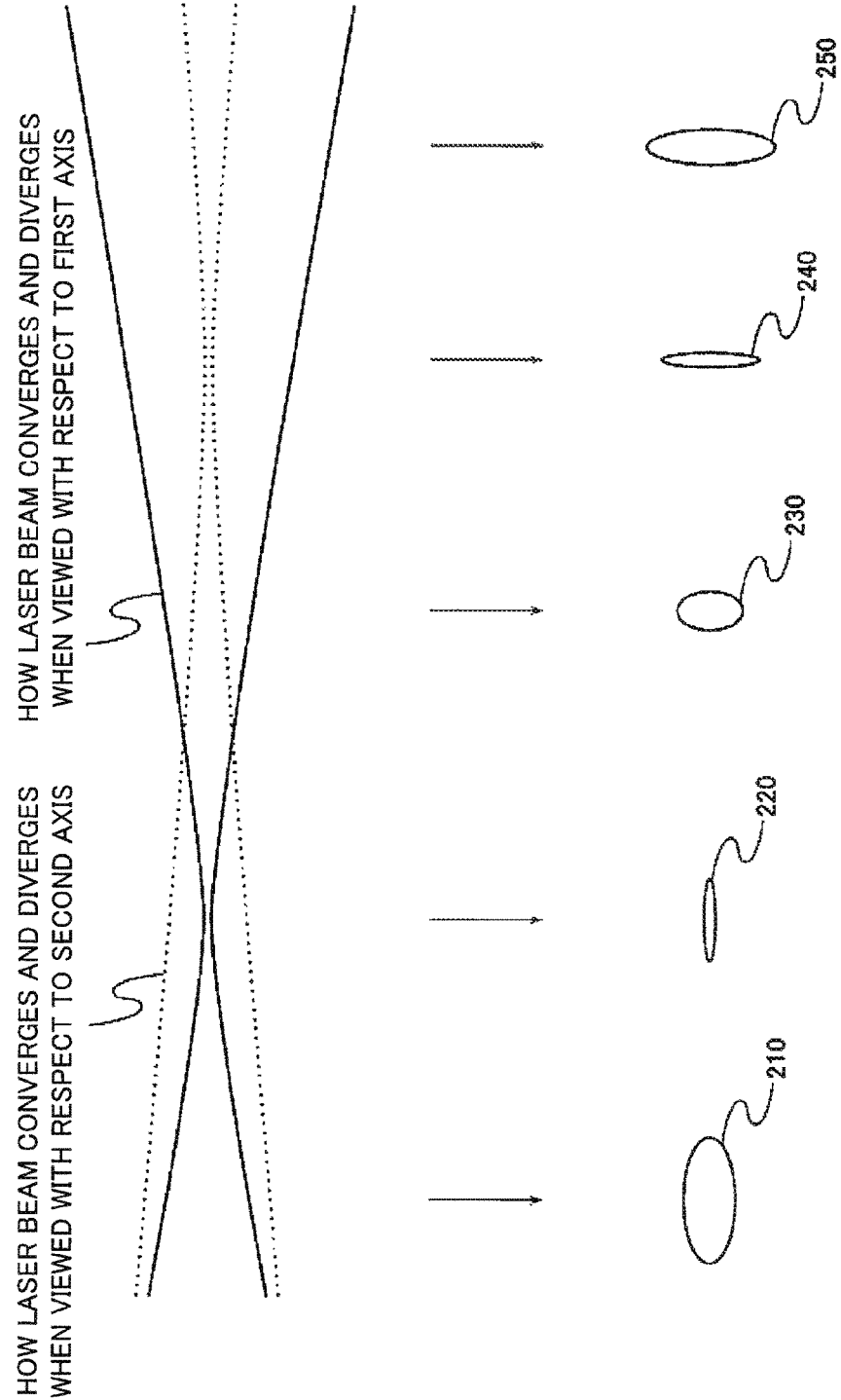
FIG. 18 is a diagram showing a change in a spot shape in the three-dimensional object-measurement device according to the exemplary embodiment 4.

When focal lengths of a laser beam are changed to be different values with respect to the first axis and the second axis, spot diameters, appearing on a measuring point, of a spot differ for the above first axis and second axis respectively. This is because the above laser beam converges and diverges with different degrees for the above two axes as the focal lengths differ with the above two axes. This situation will be described with reference to FIG. 18. FIG. 18 respectively illustrates how a laser beam irradiated by the three-dimensional object-measurement device 2000 according to the present exemplary embodiment converges and diverges with respect to the first axis and the second axis, and spots at various positions. In FIG. 18, a solid line shows how a laser beam converges and diverges seen with respect to the first axis and a dotted line shows how the laser beam converges and diverges seen with respect to the second axis. A focal length for the first axis is shorter than a focal length for the second axis. In FIG. 18, the first axis is assumed to be an axis in a vertical direction and the second axis is assumed to be an axis in horizontal direction.

A position of a spot 210 is closer than focal points for both the first axis and the second axis. A position of a spot 220 is the focal point on the first axis. A position of a spot 230 is farther than the focal point on the first axis and closer than the focal point on the second axis. A position of a spot 240 is the focal point on the second axis. A spot 250 is located farther than the focal points on both the axes.

As shown in FIG. 18, spot diameters of each spot vary with two axes. This is because spot diameters vary with two axes with different degrees as focal lengths vary with the two axes. First, with respect to the first axis, because the position of the spot 220 is the focal position, a spot diameter on the first axis is the minimum in the spot 220 and is increased as the position goes farther from the position of the spot 220. On the other hand, with respect to the second axis, because the position of the spot 240 is at the position of the focal position, a spot diameter on the second axis is decreased until reaching the position of the spot 240 and is thereafter increased.

As described in the foregoing, when focal lengths of a laser beam are changed to different sizes with respect to the first axis and the second axis, spot diameters of a spot at each position differ with the first axis and the second axis. Therefore, first, one pair of "a focal length and an angle θ" is obtained based on a spot diameter on the first axis. Further, another pair of "a focal length and an angle θ" is obtained based on a spot diameter on the second axis. As a result, two pairs of "a focal length and an angle θ" are obtained from one spot. As described above, obtaining two pairs of "a focal length and an angle θ" enables calculation of a distance to a measuring point. Accordingly, a distance to a measuring point can be calculated based on image data imaging one spot on the measuring point generated by a laser beam whose sizes are varied with the first axis and the second axis.

The three-dimensional object-measurement device 2000 of the present exemplary embodiment calculates a distance to a measuring point on the object 3000 to be measured based on the above-described principle. In FIG. 18, the first axis and the second axis are assumed to be orthogonal to each other for the purpose of simplifying description. However, in actual use, the two axes need not be orthogonal to each other as long as they are different axes.

<Flow of Distance Measuring Processing>

Figure 19:
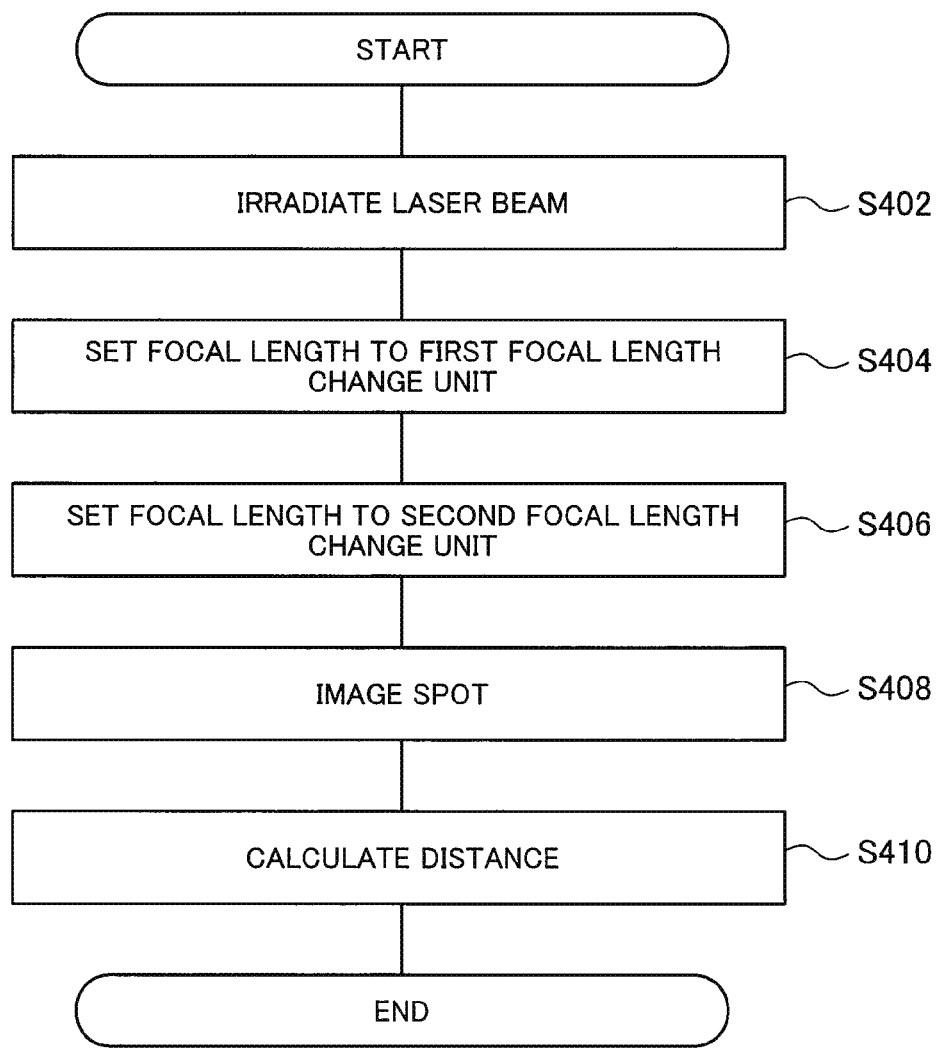
FIG. 19 is a flowchart showing a flow of distance measuring processing executed by the three-dimensional object-measurement device according to the exemplary embodiment 4.

FIG. 19 shows one example of a flow of measuring a distance to a measuring point on the object 3000 to be measured by the three-dimensional object-measurement device 2000 according to the exemplary embodiment 4.

First, at Step S402, the laser beam irradiation unit 2020 irradiates a laser beam.

At Step S404, the control unit 2080 sets a focal length to the first local length change unit 2140.

At Step S406, the control unit 2080 sets a focal length to the second local length change unit 2160. The focal length set to the second local length change unit 2160 has a value different from that of the focal length set to the first local length change unit 2140.

At Step S408, the control unit 2080 makes the imaging unit 2060 image a spot generated by a laser beam on a measuring point on the object 3000 to be measured, and obtains image data.

At Step S410, the distance calculation unit 2100 calculates a distance to the measuring point on the object 3000 to be measured based on the image data obtained at Step S408.

<Functions and Effects>

With the foregoing configuration, according to the present exemplary embodiment, the three-dimensional object-measurement device 2000 irradiates a measuring point on the object 3000 to be measured with a laser beam changed to have different focal lengths with respect to different axes by the first local length change unit 2140 and the second local length change unit 2160. Then, the three-dimensional object-measurement device 2000 calculates a distance to the measuring point based on the image data imaging a spot at the above measuring point. As a result, first, the three-dimensional object-measurement device 2000 of the present exemplary embodiment achieves the same functions and effects as those of the three-dimensional object-measurement device 2000 of the exemplary embodiment 1. Further, the three-dimensional object-measurement device 2000 according to the present exemplary embodiment can calculate a distance to a measuring point from one image data without the need of generating image data for each focal length such as the exemplary embodiment 1. As a result, the effects of reduction in time required for measurement and reduction in calculation resources required for measurement can be obtained.

Exemplary Embodiment 5

Figure 20:
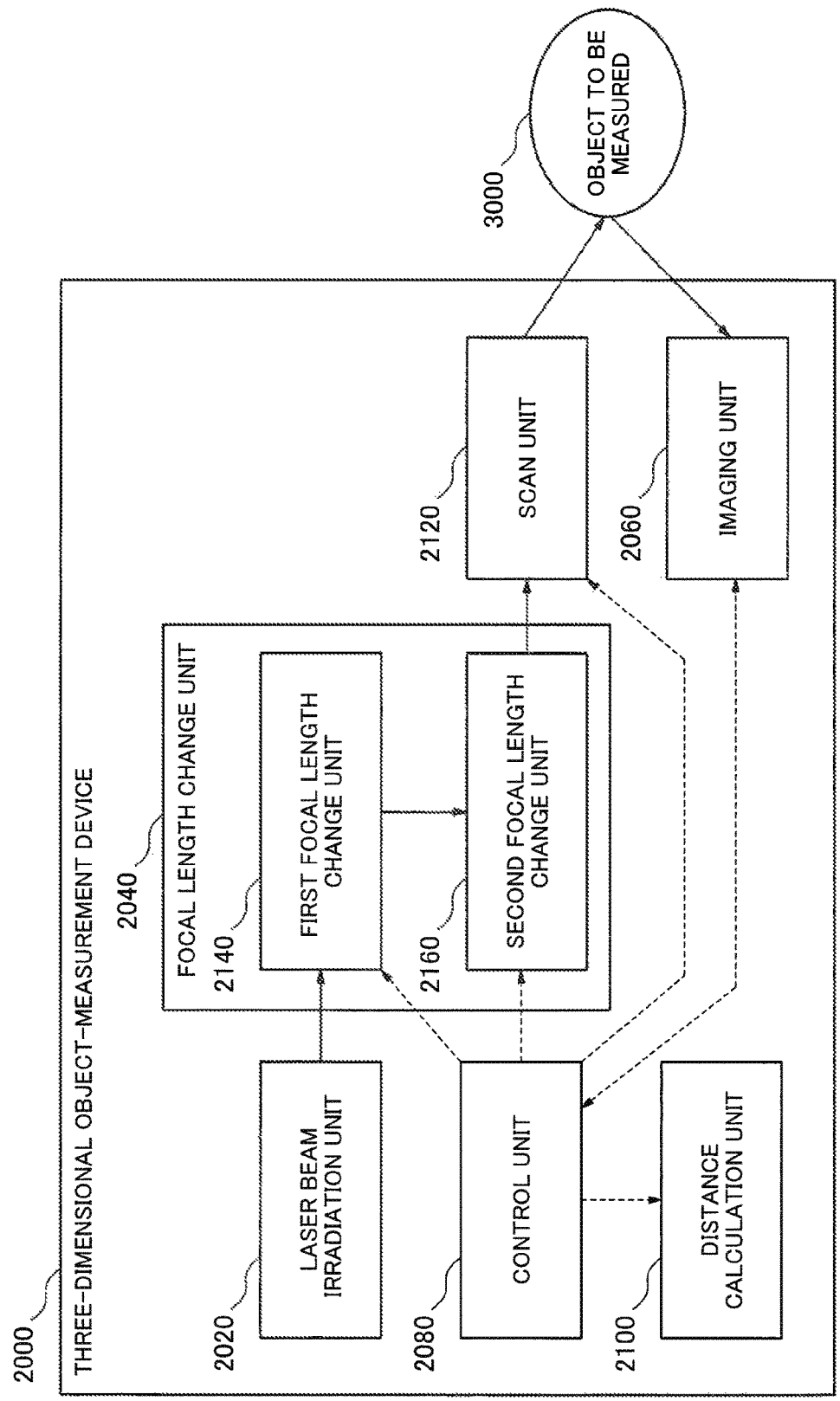
FIG. 20 is a block diagram showing a three-dimensional object-measurement device according to an exemplary embodiment 5 together with an object to be measured.

FIG. 20 is a block diagram showing a three-dimensional object-measurement device 2000 according to an exemplary embodiment 5 together with the object 3000 to be measured. Among functional blocks in FIG. 20, functional blocks having the same reference numerals as those in FIG. 10 and FIG. 16 are assumed to have the same functions as those of the functional blocks having the same reference numerals in FIG. 10 and FIG. 16 as long as no description, and description thereof is omitted. In addition, because meaning of the arrow is also the same as that of FIG. 1, its description will be omitted.

The three-dimensional object-measurement device 2000 according to the present exemplary embodiment is obtained by adding the scan unit 2120 to the three-dimensional object-measurement device 2000 according to the exemplary embodiment 4. Because the function of the scan unit 2120 is the same as that of the scan unit 2120 that the three-dimensional object-measurement device 2000 according to the exemplary embodiment 2 includes, description thereof is omitted.

By using the scan unit 2120, the three-dimensional object-measurement device 2000 according to the present exemplary embodiment calculates distances to a plurality of measuring points on the object 3000 to be measured. First, the control unit 2080 makes focal lengths of a laser beam vary with respect to the first axis and the second axis by setting different focal lengths to the first local length change unit 2140 and the second local length change unit 2160. Then, the control unit 2080 irradiates the plurality of measuring points on the object 3000 to be measured with the above laser beam by controlling the scan unit 2120. Then, the control unit 2080 separately obtains one image data for a spot at each of the measuring points by controlling the imaging unit 2060. Then, the distance calculation unit 2100 calculates a distance to each measuring point based on the generated image data.

<Flow of Distance Measuring Processing>

Figure 21:
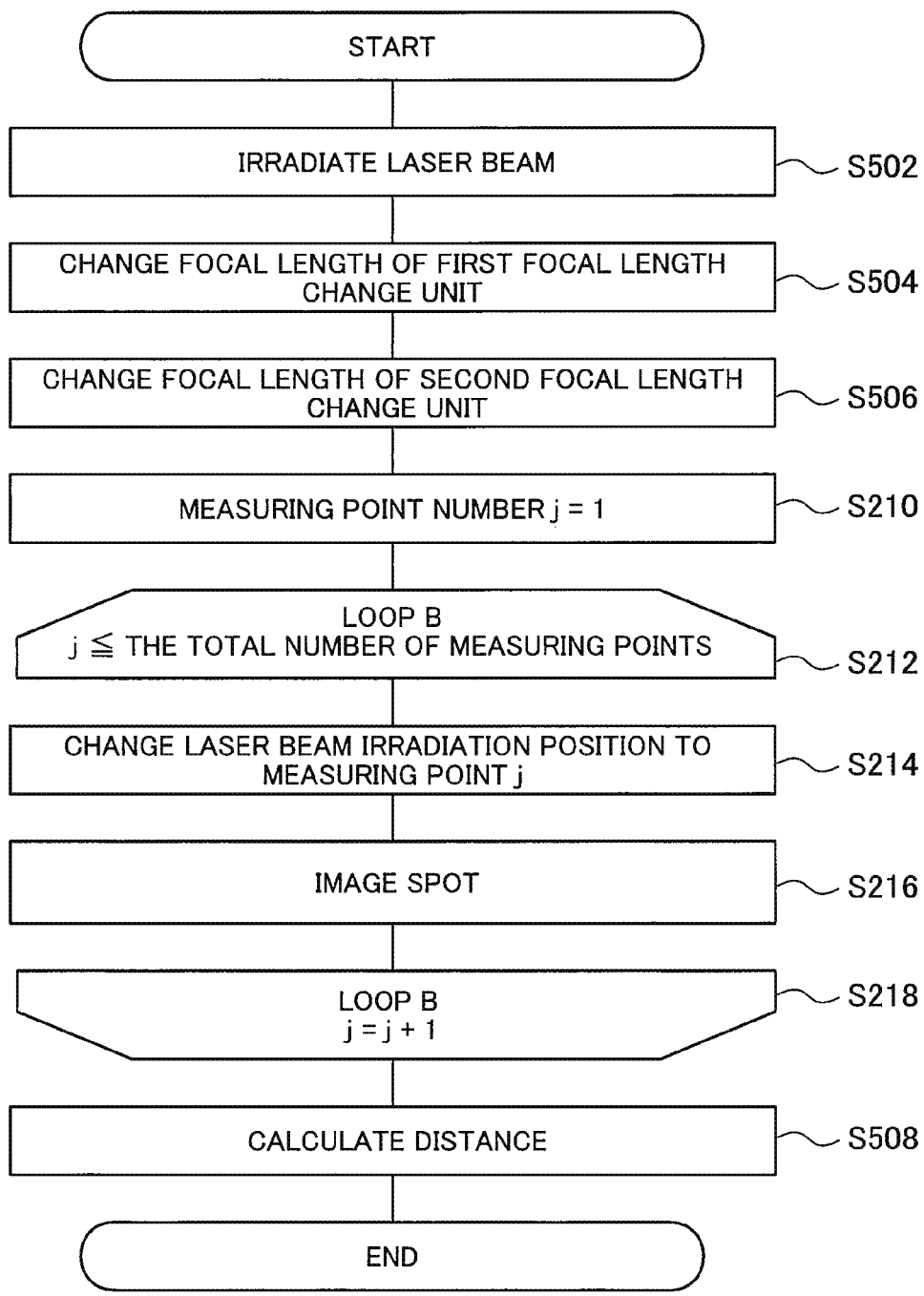
FIG. 21 is a flowchart showing a flow of distance measuring processing executed by the three-dimensional object-measurement device according to the exemplary embodiment 5.

FIG. 21 is shows one example of a flow of measuring a distance to a measuring point on the object 3000 to be measured by the three-dimensional object-measurement device 2000 according to the exemplary embodiment 4.

First, at Step S502, the laser beam irradiation unit 2020 irradiates a laser beam.

At Step S504, the control unit 2080 sets a focal length to the first local length change unit 2140.

At Step S506, the control unit 2080 sets a focal length to the second local length change unit 2160. The focal length set to the second local length change unit 2160 has a different value from that of the focal length set to the first local length change unit 2140.

Processing at Step S210 to Step S218 is the same as that at Step S210 to Step S220 shown in FIG. 13. Specifically, the processing includes, with respect to each measuring point j, irradiating the measuring point j with a laser beam by the scan unit 2120 and imaging a spot at the measuring point j by the imaging unit 2060.

Then, at Step S508, the distance calculation unit 2100 calculates a distance to each measuring point j on the object 3000 to be measured based on the image data imaging the spot at each measuring point j.

<Functions and Effects>

With the foregoing configuration, according to the present exemplary embodiment, the three-dimensional object-measurement device 2000 further includes the scan unit 2120. Then, the three-dimensional object-measurement device 2000 respectively makes image data for a spot at each measuring point be generated by controlling the imaging unit 2060 by the control unit 2080. Then, the three-dimensional object-measurement device 2000 respectively calculates a distance to each measuring point by executing processing by the distance calculation unit 2100 based on the generated image data. As a result, first, the three-dimensional object-measurement device 2000 of the present exemplary embodiment achieves the same functions and effects as those of the exemplary embodiment 4. Further, the three-dimensional object-measurement device 2000 of the present exemplary embodiment can measure distances to a plurality of measuring points at once. As a result, a load on an operator who operates the three-dimensional object-measurement device 2000 is reduced.

Exemplary Embodiment 6

A configuration of a three-dimensional object-measurement device 2000 according to an exemplary embodiment 6 is, for example, the configuration as shown in FIG. 20, similarly to the exemplary embodiment 5. Therefore, description of the configuration of the three-dimensional object-measurement device 2000 will be omitted.

Similarly to the control unit 2080 according to the exemplary embodiment 3, the control unit 2080 according to the exemplary embodiment 6 images spots at a plurality of measuring points on the object 3000 to be measured as one image. Then, the distance calculation unit 2100 calculates distances to the above plurality of measuring points on the object 3000 to be measured based on the generated one image data.

<Flow of Distance Measuring Processing>

Figure 22:
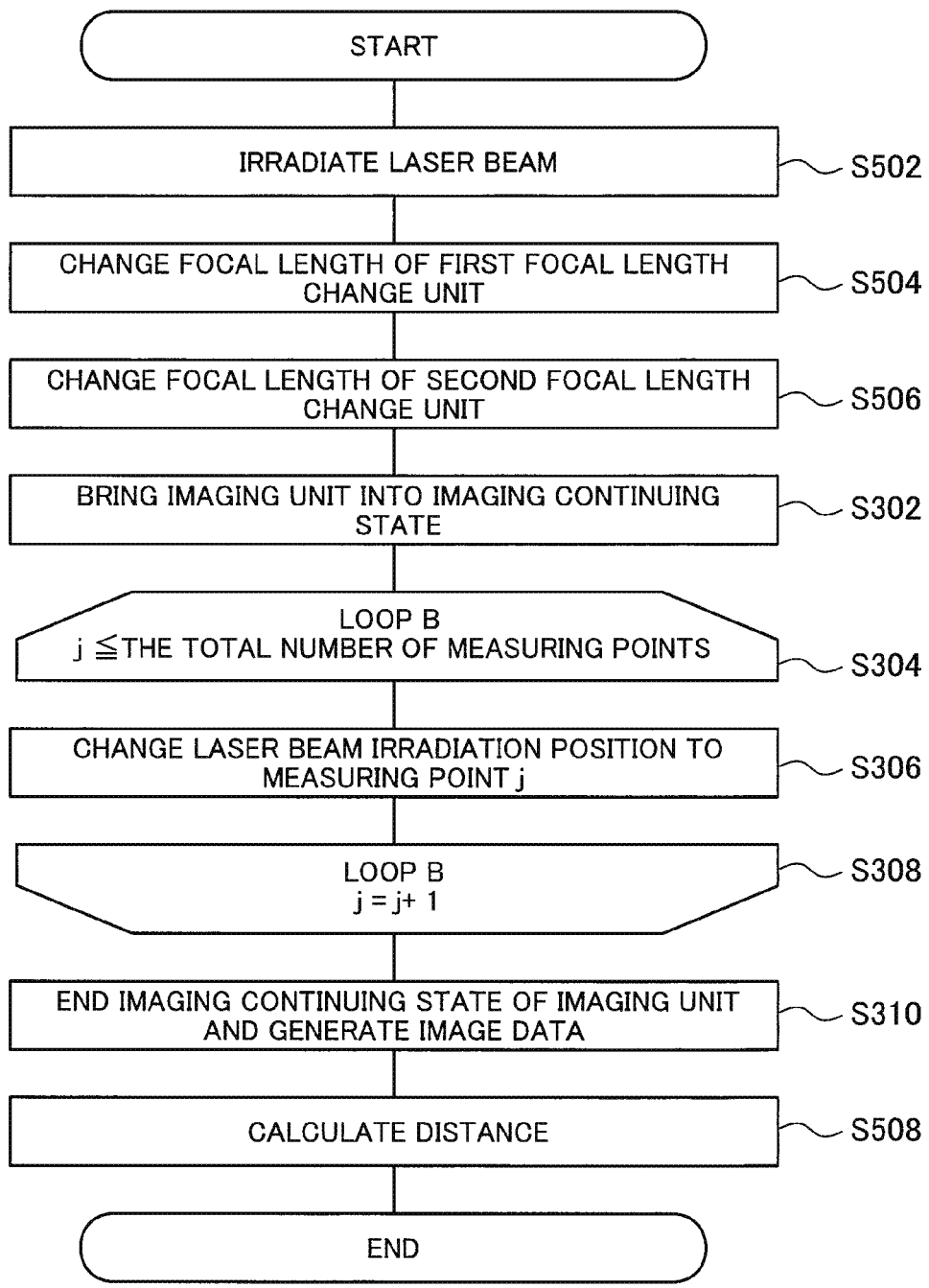
FIG. 22 is a flowchart showing a flow of distance measuring processing executed by a three-dimensional object-measurement device according to an exemplary embodiment 6.

FIG. 22 shows one example of a flow of measuring a distance to a measuring point on the object 3000 to be measured by the three-dimensional object-measurement device 2000 according to the exemplary embodiment 6.

Step S502 to Step S506 is the same processing as that executed by the three-dimensional object-measurement device 2000 according to the exemplary embodiment 5. The laser beam irradiation unit 2020 irradiates a laser beam, and the control unit 2080 sets different focal lengths to the first local length change unit 2140 and the second local length change unit 2160.

Processing at Step S302 to Step S310 to be subsequently executed is the same as that executed by the three-dimensional object-measurement device 2000 according to the exemplary embodiment 3. The control unit 2080 irradiates each measuring point on the object 3000 to be measured with a laser beam by controlling the scan unit 2120 while maintaining the imaging unit 2060 at the imaging continuing state. Then, after finishing irradiating all the measuring points with the laser beam, the three-dimensional object-measurement device 2000 ends the imaging continuing state of the imaging unit 2060. As a result, the three-dimensional object-measurement device 2000 generates one image data imaging spots at all the measuring points.

Processing at Step S508 to be subsequently executed is the same as that executed by the three-dimensional object-measurement device 2000 according to the exemplary embodiment 5. The three-dimensional object-measurement device 2000 respectively calculates distances to the plurality of measuring points on the object 3000 to be measured based on the above one image data.

<Functions and Effects>

With the foregoing configuration, according to the present exemplary embodiment, the three-dimensional object-measurement device 2000 records spots at a plurality of measuring points on the object 3000 to be measured in one image data collectively. Then, the three-dimensional object-measurement device 2000 respectively calculates distances to the plurality of measuring points based on the above one image data. As a result, first, the three-dimensional object-measurement device 2000 of the present exemplary embodiment achieves the same functions and effects as those of the three-dimensional object-measurement device 2000 of the exemplary embodiment 5. Further, the three-dimensional object-measurement device 2000 of the present exemplary embodiment reduces the number of executions of the image generation processing because spots at a plurality of measuring points are stored in one image data. Accordingly, time required for measurement is further reduced. In addition, the three-dimensional object-measurement device 2000 of the present exemplary embodiment reduces the number of image data generated by the imaging unit 2060. As a result, the amount of calculation resources required for the processing is further reduced.

Exemplary Embodiment 7

A three-dimensional object-measurement device 2000 according to an exemplary embodiment 7 is represented by FIG. 10 or FIG. 20. Therefore, as long as no description, description of each functional block is omitted.

The laser beam irradiation unit 2020 in the three-dimensional object-measurement device 2000 according to the exemplary embodiment 7 simultaneously irradiates a part of or all of the plurality of measuring points on the object 3000 to be measured with a laser beam. By this manner, spots on the plurality of measuring points is simultaneously imaged.

Figure 23:
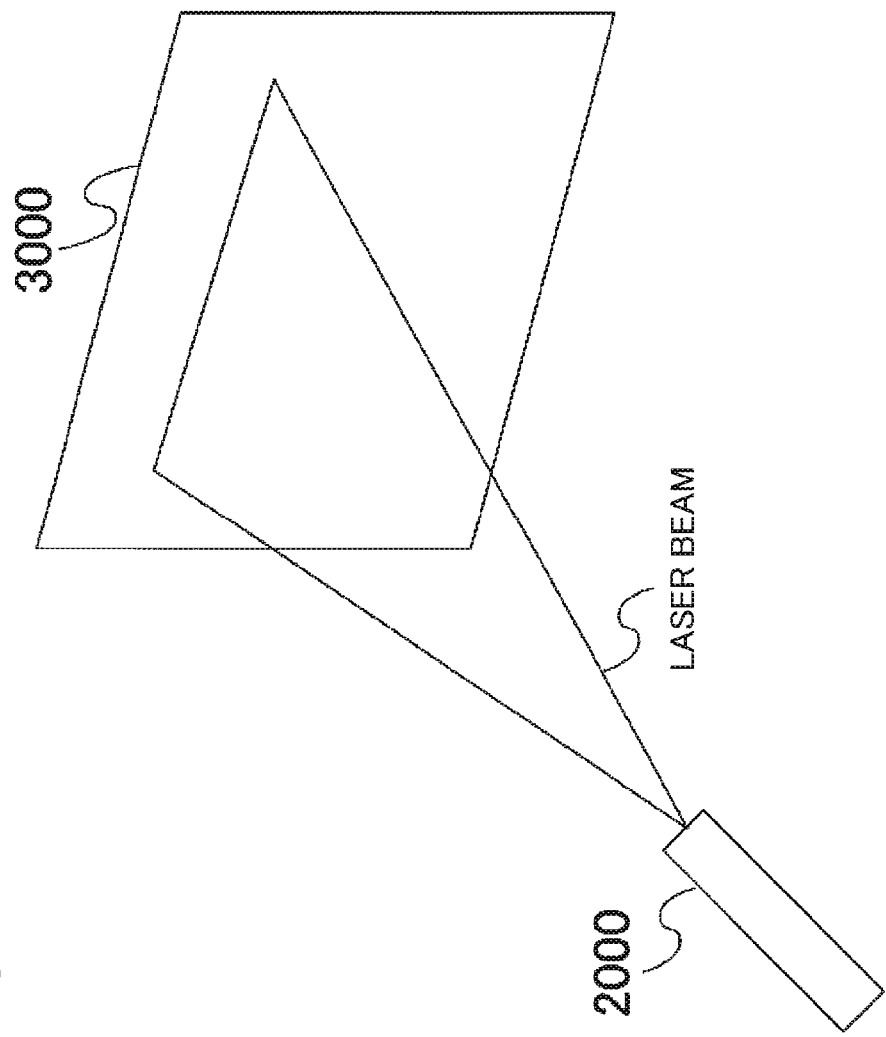
FIG. 23 is a diagram showing an aspect of a irradiated laser beam by a three-dimensional object-measurement device according to an exemplary embodiment 7.

The laser beam irradiation unit 2020 irradiates a laser beam which spreads in a horizontal direction in a manner as shown in FIG. 23, for example. As a result, the laser beam irradiation unit 2020 can simultaneously irradiate measuring points arranged in the horizontal direction with a laser beam.

A method of irradiating a plurality of measuring points with a laser beam by the laser beam irradiation unit 2020 is not limited to the above-described method. For example, the laser beam irradiation unit 2020 may irradiate a laser beam spreading in a vertical direction. In addition, the laser beam irradiation unit 2020 may irradiate, with a laser beam, not a plurality of measuring points arranged regularly such as in the horizontal direction or the vertical direction but a plurality of measuring points located at random. The realization method therefor includes a method in which with the laser beam irradiation unit 2020 having a plurality of laser beam sources and the scan unit 2120 having a plurality of scan mechanisms, each of the plurality of scan mechanisms irradiates each measuring point with a laser beam irradiated by each laser beam source.

<Functions and Effects>

With the foregoing configuration, according to the present exemplary embodiment, the laser beam irradiation unit 2020 simultaneously irradiates a part of or all of the plurality of measuring points on the object 3000 to be measured with a laser beam. As a result, when simultaneously calculating distances to a plurality of measuring points, because the number of times of laser beam direction change executed by the scan unit 2120 can be reduced, a measurement time can be reduced.

Although the exemplary embodiments of the present invention have been described with reference to the drawings in the foregoing, such is for illustrative purpose only and other various configurations than those described above can be employed.

Hereinafter, exemplary embodiments for reference will be additionally described.

1. A three-dimensional object-measurement device includes:

a laser beam irradiation unit which irradiates a laser beam;

a focal length changing unit which changes a focal length of the laser beam;

an imaging unit which images a reflected light which is a reflection of the laser beam on an object, and generates image data;

a control unit which changes the focal length by controlling the focal length changing unit, irradiates the same point on an object to be measured with the laser beam a plurality of times while varying the focal length, and makes the imaging unit generate the plurality of image data; and a distance calculation unit which calculates a distance to the object to be measured by processing the plurality of image data.

2. The three-dimensional object-measurement device according to 1, further includes:

a scanning unit which changes an irradiation direction of the laser beam, wherein when measuring distances to a plurality of measuring points on the object to be measured, the control unit fixes a focal distance by controlling the focal length changing unit, irradiating each of the plurality of measuring points with the laser beam by controlling the scanning unit and the imaging unit, and obtaining the image data for each of the plurality of measuring points, and, after changing a focal length by controlling the focal length changing unit, irradiates each of the plurality of measuring points with the laser beam by controlling the scanning unit and the imaging unit again, and obtains the image data according to each of the plurality of measuring points, and the distance calculation unit processes the image data and calculates a distance to each of the plurality of measuring points.

3. A three-dimensional object-measurement device includes:

a laser beam irradiation unit which irradiates a laser beam;

a focal length changing unit which has a first focal length changing unit which changes a focal length of the laser beam on a first axis on a plane perpendicular to an irradiation direction of the laser beam and a second focal length changing unit which changes, on a second axis being an axis different from the first axis on the plane, a focal length of the laser beam passing the first focal length changing unit;

an imaging unit which images a reflected light which is a reflection of the laser beam on an object, and generating image data;

a control unit which sets different focal lengths to the first focal length changing unit and the second focal length changing unit by controlling the focal length changing unit, and obtains the image data; and a distance calculation unit which calculates a distance to the object based on the image data.

4. The three-dimensional object-measurement device according to 3, further includes:
a scanning unit which changes an irradiation direction of the laser beam,
wherein
when measuring distances to a plurality of measuring points on the object to be measured,
the control unit irradiates each of the plurality of measuring points with the laser beam by controlling the scanning unit and the imaging unit, and obtains the image data, and
the distance calculation unit calculates a distance to each of the plurality of measuring points based on the image data.

5. The three-dimensional object-measurement device according to 2, wherein
the laser beam irradiation unit simultaneously irradiates the plurality of measuring points on the object to be measured with the laser beam.

6. The three-dimensional object-measurement device according to 1, wherein
the focal length changing unit includes: a plurality of optical elements through which the laser beam passes
wherein
the focal length changing mean changes a focal length of the laser beam by changing a distance between the plurality of optical elements.

7. The three-dimensional object-measurement device according to 1, wherein
the focal length changing unit includes:
a plurality of optical elements having different focal lengths wherein
the focal length changing unit changes a focal length of the laser beam by changings the optical element through which the laser beam is passed to.

8. The three-dimensional object-measurement device according to 2, 4 or 5, wherein
the focal length changing unit includes:
a focal length variable optical system wherein
the focal length changing unit changes a focal length of the laser beam by changing a focal length of the focal length variable optical system.

9. A computer readable non-transitory medium embodying a program, the program causing a three-dimensional object-measurement device to performs a method, the method includes:
irradiating a laser beam;
changing a focal length of the laser beam;
imaging a reflected light which is a reflection of the laser beam on an object and generating image data;
changing a focal length
irradiating the same point on an object to be measured with the laser beam a plurality to times while varying a focal length;
generating the image data; and
calculating a distance to the object to be measured by processing the plurality of image data.

10. The computer readable non-transitory medium according to 9, the method includes: changings an irradiation direction of the laser beam,
wherein
when measuring distances to a plurality of measuring points on the object to be measured, further includes:
fixing a focal distance, irradiating each of the plurality of measuring points with the laser beam by controlling the scanning means and the imaging means, and obtaining the image data for each of the plurality of measuring points; and,
after changing a focal length, irradiating each of the plurality of measuring points with the laser beam again, and obtaining the image data according to each of the plurality of measuring points; and
processing the image data and calculating a distance to each of the plurality of measuring points.

11. A computer readable non-transitory medium embodying a program, the program causing a three-dimensional object-measurement device to performs a method, the method includes:
irradiating a laser beam;
changing means having first focal length changing a focal length of the laser beam on a first axis on a plane perpendicular to an irradiation direction of the laser beam and changing, on a second axis being an axis different from the first axis on the plane, a focal length of the laser beam after changing on the first axis;
imaging a reflected light which is a reflection of the laser beam on an object; and generating image data;
setting different focal lengths;
obtaining the image data; and
calculating a distance to the object based on the image data.

12. The computer readable non-transitory medium according to 11, the method further includes:
changing an irradiation direction of the laser beam,
wherein
when measuring distances to a plurality of measuring points on the object to be measured, further includes:
irradiating each of the plurality of measuring points with the laser beam, and obtaining the image data for each of the plurality of measuring points; and
calculating a distance to each of the plurality of measuring points based on the image data.

13. A control method to be executed by a three-dimensional object-measurement device which measures a distance to an object to be measured, includes:
irradiating a laser beam;
changing a focal length of the laser beam;
imaging a reflected light which is a reflection of the laser beam on an object and generating image data;
changing a focal length;
irradiating the same point on an object to be measured with the laser beam a plurality of times while varying the focal length; generating the plurality of image data; and
calculating a distance to the object to be measured by processing the plurality of image data.

14. The control method according to 13, further includes:
changings an irradiation direction of the laser beam;
wherein
when measuring distances to a plurality of measuring points on the object to be measured, further includes:
fixing a focal distance, irradiating each of the plurality of measuring points with the laser beam, and obtaining the image data for each of the plurality of measuring points; and,
changing a focal length, irradiating each of the plurality of measuring points with the laser beam, and obtaining the image data according to each of the plurality of measuring points; and
processing the image data and calculating a distance to each of the plurality of measuring points.

15. A control method to be executed by a three-dimensional object-measurement device which measures a distance to an object to be measured, includes:
irradiating a laser beam;
changing a focal length of the laser beam on a first axis on a plane perpendicular to an irradiation direction of the laser beam and changing, on a second axis being an axis different from the first axis on the plane, a focal length of the laser beam after changing on the first axis;

imaging a reflected light which is a reflection of the laser beam on an object, and generating image data;

changing a focal length of the laser beam on a first axis;

changing, on a second axis being an axis different from the first axis on the plane, a focal length of the laser beam after changing on the first axis;

generating the image data; and calculating a distance to the object based on the image data.

16. The control method according to 15, further includes:

changing an irradiation direction of the laser beam, wherein when measuring distances to a plurality of measuring points on the object to be measured, further includes:

irradiating each of the plurality of measuring points with the laser beam;

obtaining the image data for each of the plurality of measuring points; and calculating a distance to each of the plurality of measuring points based on the image data.

This application is based upon and claims the benefit of priority from Japanese patent application No. 2012-165940, filed on Jul. 26, 2012, the disclosure of which is incorporated herein in its entirety by reference.

What is claimed is:

1. A three-dimensional object-measurement device comprising:

a laser beam irradiator which irradiates a laser beam;

a focal length switcher which switches a focal length of the laser beam;

an imager which images a reflected light which is a reflection of the laser beam on an object, and generates image data;

a processor; and a memory, wherein the processor is configured to execute:

a control unit which changes the focal length by controlling the focal length switcher, irradiates the same point on an object to be measured with the laser beam a plurality of times while varying the focal length by controlling the focal length switcher, and makes the imager generate the plurality of image data; and a distance calculation unit which calculates a distance to the object to be measured by processing the plurality of image data, wherein the plurality of image data comprises an image of a spot of the laser beam, the spot having a spot diameter, wherein the distance calculation unit is configured to determine a spot angle based on the spot diameter, and wherein the spot angle varies according to the distance to the object to be measured.

2. The three-dimensional object-measurement device according to claim 1, further comprising:

a scanner which changes an irradiation direction of the laser beam, wherein when measuring distances to a plurality of measuring points on the object to be measured, the control unit fixes a focal distance by controlling the focal length changing unit, irradiating each of the plurality of measuring points with the laser beam by controlling the scanner and the imager, and obtaining the image data for each of the plurality of measuring points, and, after changing a focal length by controlling the focal length switcher, irradiates each of the plurality of measuring points with the laser beam by controlling the scanner and the imager again, and obtains the image data according to each of the plurality of measuring points, and the distance calculation unit processes the image data and calculates a distance to each of the plurality of measuring points.

3. The three-dimensional object-measurement device according to claim 2, wherein the laser beam irradiator simultaneously irradiates the plurality of measuring points on the object to be measured with the laser beam.

4. The three-dimensional object-measurement device according to claim 2, wherein the focal length switcher comprises:

a focal length variable optical system, wherein the focal length switcher switches a focal length of the laser beam by changing a focal length of the focal length variable optical system.

5. The three-dimensional object-measurement device according to claim 1, wherein the focal length switcher comprises: a plurality of optical elements through which the laser beam passes, wherein the focal length switcher switches a focal length of the laser beam by changing a distance between the plurality of optical elements.

6. The three-dimensional object-measurement device according to claim 1, wherein the focal length switcher comprises:

a plurality of optical elements having different focal lengths, wherein the focal length switcher switches a focal length of the laser beam by changing the optical element through which the laser beam is passed.

7. The three-dimensional object-measurement device according to claim 1, wherein the focal length switcher comprises a position-fixed optical element and a variable position optical element, wherein the focal length of the laser beam is determined by a position of the variable position optical element.

8. The three-dimensional object-measurement device according to claim 1, wherein the focal length switcher comprises a plurality of optical elements each having a different focal length arranged in a disc, wherein the focal length switcher is configured to switch the focal length of the laser beam by rotating the disc.

9. The three-dimensional object-measurement device according to claim 1, wherein the focal length switcher comprises a plurality of optical elements each having a different focal length arranged in stripes, wherein the focal length switcher is configured to switch the focal length of the laser beam by adjusting the position of the plurality of optical elements to change the optical element through which the laser beam is to be passed.

10. A computer readable non-transitory medium embodying a program, the program causing a three-dimensional object-measurement device to perform a method, the method comprising:

irradiating a laser beam;
imaging a reflected light which is a reflection of the laser beam on an object and generating image data;
switching the focal length of the laser beam;
irradiating the same point on an object to be measured with the laser beam a plurality of times while varying the focal length;
generating the plurality of image data; and
calculating a distance to the object to be measured by processing the plurality of image data,
wherein the plurality of image data comprises an image of a spot of the laser beam, the spot having a spot diameter,
wherein the calculating the distance to the object to be measured comprises determining a spot angle based on the spot diameter, and
wherein the spot angle varies according to the distance to the object to be measured.

11. The computer readable non-transitory medium according to claim 10, wherein the switching the focal length of the laser beam comprises adjusting a position of a variable position optical element.

12. The computer readable non-transitory medium according to claim 10, wherein the switching the focal length of the laser beam comprises rotating a disc, the disc comprising a plurality of optical elements each having a different focal length.

13. The computer readable non-transitory medium according to claim 10, wherein the switching the focal length of the laser beam comprises adjusting the position of a plurality of optical elements arranged in stripes, the plurality of optical elements each having a different focal length.

14. A control method to be executed by a three-dimensional object-measurement device which measures a distance to an object to be measured, the control method comprising:
irradiating a laser beam;
imaging a reflected light which is a reflection of the laser beam on an object and generating image data;
switching the focal length of the laser beam;
irradiating the same point on an object to be measured with the laser beam a plurality of times while varying the focal length;
generating the plurality of image data; and
calculating a distance to the object to be measured by processing the plurality of image data,
wherein the plurality of image data comprises an image of a spot of the laser beam, the spot having a spot diameter,
wherein the calculating the distance to the object to be measured comprises determining a spot angle based on the spot diameter, and
wherein the spot angle varies according to the distance to the object to be measured.

15. The control method according to claim 14, wherein the switching the focal length of the laser beam comprises adjusting a position of a variable position optical element.

16. The control method according to claim 14, wherein the switching the focal length of the laser beam comprises rotating a disc, the disc comprising a plurality of optical elements each having a different focal length.

17. The control method according to claim 14, wherein the switching the focal length of the laser beam comprises adjusting the position of a plurality of optical elements arranged in stripes, the plurality of optical elements each having a different focal length.

* * * * *